(12) United States Patent
Lund

(10) Patent No.: US 7,031,949 B2
(45) Date of Patent: Apr. 18, 2006

(54) METHOD AND APPARATUS FOR GENERATING INPUT SIGNALS IN A PHYSICAL SYSTEM

(75) Inventor: Richard A. Lund, Chaska, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 789 days.

(21) Appl. No.: 10/057,294

(22) Filed: Nov. 8, 2001

(65) Prior Publication Data

US 2003/0033058 A1   Feb. 13, 2003

Related U.S. Application Data

(63) Continuation-in-part of application No. 09/234,998, filed on Jan. 21, 1999, now abandoned.

(60) Provisional application No. 60/072,161, filed on Jan. 22, 1998.

(51) Int. Cl.
*G06N 5/00* (2006.01)
(52) U.S. Cl. .............................. 706/14; 700/30; 700/31
(58) Field of Classification Search .................. 700/30, 700/31; 702/189; 706/14
See application file for complete search history.

(56) References Cited

U.S. PATENT DOCUMENTS

| | | | |
|---|---|---|---|
| 3,855,841 A | 12/1974 | Hunter | 73/11 |
| 4,061,017 A | 12/1977 | Sloane et al. | 73/579 |
| 4,480,480 A | 11/1984 | Scott et al. | 73/769 |
| 4,513,622 A | 4/1985 | Uretsky | 73/664 |
| 4,537,076 A | 8/1985 | Lax et al. | 73/662 |
| 4,916,632 A | 4/1990 | Doi et al. | 364/508 |
| 4,989,158 A | 1/1991 | Sloane | 364/508 |
| 5,091,843 A * | 2/1992 | Peczkowski | 700/30 |
| 5,175,678 A | 12/1992 | Frerichs et al. | 364/148 |
| 5,209,661 A | 5/1993 | Hildreth et al. | 434/45 |
| 5,339,016 A | 8/1994 | Thoen | 318/610 |
| 5,353,207 A | 10/1994 | Keeler et al. | 364/164 |
| 5,377,307 A | 12/1994 | Hoskins et al. | 395/22 |
| 5,519,605 A * | 5/1996 | Cawlfield | 700/31 |
| 5,568,404 A | 10/1996 | Strumolo | 364/558 |
| 5,572,440 A | 11/1996 | Harashima et al. | 364/508 |
| 5,598,329 A | 1/1997 | Miemann | 364/150 |

(Continued)

FOREIGN PATENT DOCUMENTS

| WO | WO 85/03547 | 8/1985 |
|---|---|---|
| WO | WO 97/42553 | 11/1997 |

OTHER PUBLICATIONS

B.W. Cryer et al., "A Road Simulation System for Heavy Duty Vehicles", Society of Automotive Engineers, Automotive Engineering Congress and Exposition, Detroit, Michigan, Feb. 23-17, 1976, pp. 1-13.

(Continued)

*Primary Examiner*—Wilbert L. Starks, Jr.
(74) *Attorney, Agent, or Firm*—Steven M. Koehler; Westman, Champlin & Kelly, P.A.

(57) ABSTRACT

A method and apparatus for controlling a physical system responsive to an input to produce a selected output comprises defining a virtual identity system that includes the physical system for receiving the input to provide an actual output. A quality of identity of the virtual identity system is checked using at least a function of the actual output. In a preferred embodiment, adjustments are made to a model of the physical system as a function the quality of identity in order to render the correct input more efficiently and accurately.

51 Claims, 23 Drawing Sheets

U.S. PATENT DOCUMENTS

| | | | |
|---|---|---|---|
| 5,623,402 A | 4/1997 | Johnson | 364/162 |
| 5,649,063 A | 7/1997 | Bose | 395/22 |
| 5,659,667 A | 8/1997 | Buescher et al. | 395/23 |
| 5,729,463 A | 3/1998 | Koenig et al. | 364/468.04 |
| 5,732,373 A | 3/1998 | Endo | 701/42 |
| 5,777,872 A | 7/1998 | He | 364/149 |
| 5,796,849 A | 8/1998 | Coleman et al. | 381/1.8 |
| 5,901,072 A | 5/1999 | Shimmell | 364/578 |
| 5,949,989 A | 9/1999 | Falkowski et al. | 395/500.29 |
| 6,611,823 B1* | 8/2003 | Selmic et al. | 706/14 |
| 6,697,767 B1* | 2/2004 | Wang et al. | 702/189 |

OTHER PUBLICATIONS

Richard A. Lund, "Multiple Channel Environmental Simulation Techniques" MTS Systems Corporation, Oct. 1-2, 1979, pp. 1-20.

J.B. Craig, "ITFC—How it works and where to use it", Carl Schenck AG, Sep. 1979, pp. 1-61.

Rao, Guthikonda V., Complex Digital Control Systems: Van Nostrand Company, 1979, pp. 52-52.

Jürgen Petersen et al., SAE Technical Paper Series—The Conception, Description, and Application of a New Vehicle Endurance Test System at AUDI NS, International Congress and Exposition, Detroit, Michigan Feb. 22-26, 1982, pp. 1-13.

Richard A. Lund, "Advances In Multiple-Channel Environmental Simulation Techniques", Seminar on Modernization in Automotive Technology, Automotive Research Association of India, Pune, India, Dec. 16-17, 1983.

"RPC-II, Section FDB—Frequency Domain Baseline", MTS Systems Corporation, 1987.

"RPC-11 Software, Spectral Density Iteration", for MTS Systems Corporation, 1987.

"RPC-II Software, Section RPC—Introduction to RPC-II" MTS Systems Corporation, 1987.

Phil Grote and Glen Grenier, "Taking the Test Track to the Lab" Automotive Engineers, Jun. 1987, vol. 95, No. 6, pp. 61-64.

Ian Cook, "Appendix A—User Presentations: How to Get a Drive File—Jaguar Cars", RPC User Group, 8th RPC User Group Meeting, Nov. 9-10, 1988, Eindhover, the Netherlands, pp. 1-51.

"RPC-II Software, Section FRF—Frequency Response Function" MTS Systems Corporation, 1988.

"RPC-11 Software, Section THI—Time History Iteration" MTS Systems Corporation, 1988.

Iain G. McGregor, "Use of the Iterative De-Convolution Method for Vehicle Stimilations", Automotive technology and automation: 20th International Symposium, May 1989, Florence, Italy, pp. 889-905.

Lee, H. et al., "Nonlinear System Identification Using Recurrent networks, Neural Networks", IEEE International Joint Conference on, Nov. 1991, pp. 2410-2415, vol. 3.

Kimota et al., "Inverse Modeling of Dynamical System-Network Architecture with Identification Network and Adaptation Network", Neural Networks, IEEE International Joint Conferences on, Nov. 1991.

MTS Brochure: "Explaining the Six Steps of Remote Parameter Control™", MTS Systems Corporation, May 1996, pp. 1-11.

"Adaptive Inverse control (AIC) and Online Iteration (OLI) ", MTS Systems Corporation, 1997.

"RPC-III Simulation Testing, Analysis, and Control System", for MTS Systems Corporation, 1997.

Witkosski et al., "System Identification Using Selforganizing Feature Maps", Artificial Neural Networks, Fifth International Conference on, vol. 2, Oct. 1997, pp. 100-101.

Chon et al., "Linear and Nonlinear System Identification of Autonomic Heart-rate Modulation", IEEE Engineering in Medicine and Biology Magazine, vol. 16, Issue 5, Sep.-Oct. 1997.

Sasaki et al., "Identification and Control of a Non-minimum Phase Flexible Dynamical System Using Neural Networks, Systems, Man and Cybernetics", 1998 IEEE International Conference on, vol. 2, Oct. 1998.

Wolpert et al., "Multiple Paired Forward and Inverse Models for Motor Control," Neural Networks, vol. 11, No. 7/08, Oct. 1998, pp. 1317-1329.

* cited by examiner

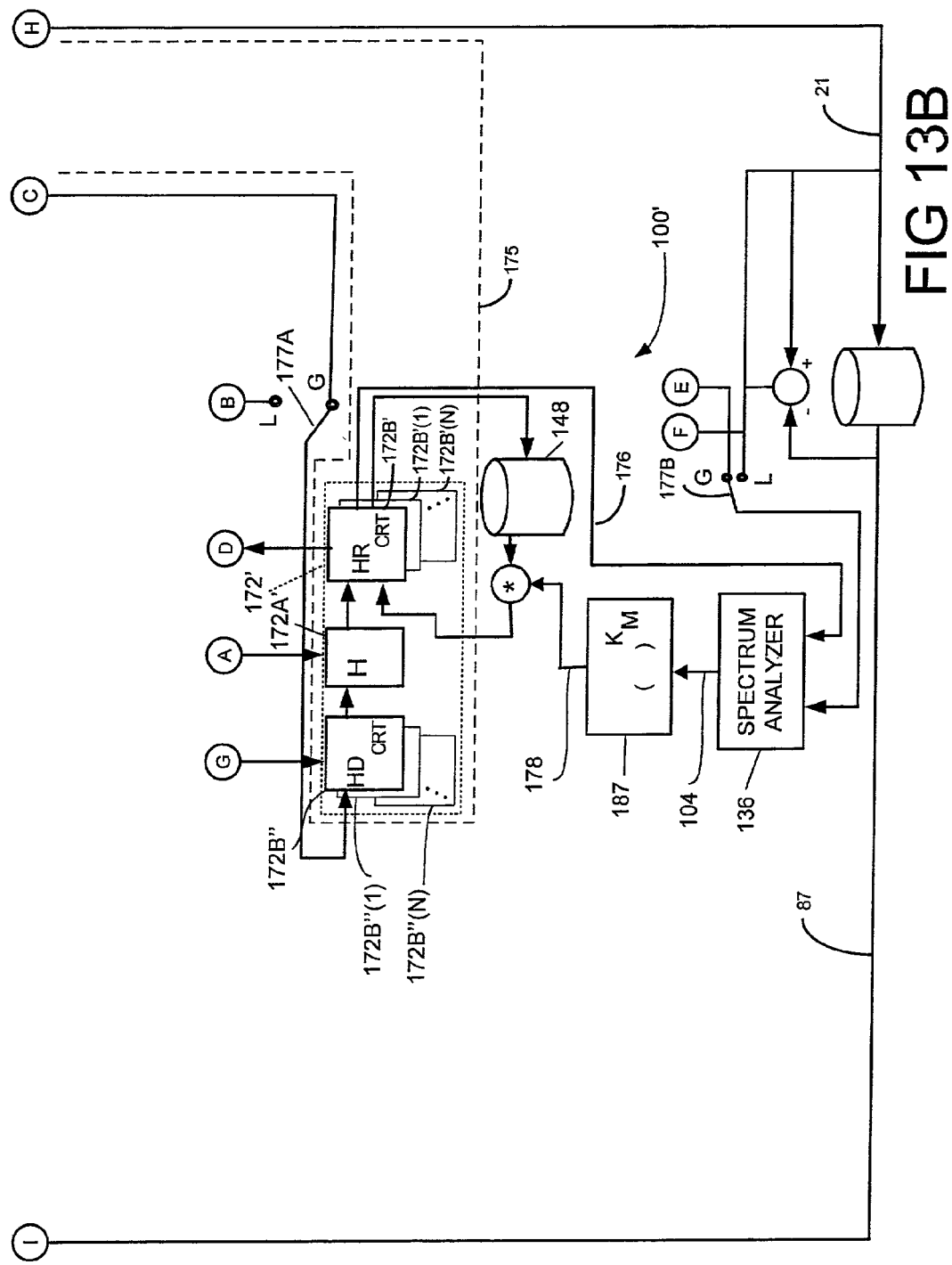

METHOD AND APPARATUS FOR GENERATING INPUT SIGNALS IN A PHYSICAL SYSTEM

CROSS-REFERENCE TO RELATED APPLICATIONS

This application is a continuation-in-part of and claims priority of application Ser. No. 09/234,998, filed Jan. 21, 1999 now abandoned, the content of which is hereby incorporated by reference in its entirety, the priority application being based on and claiming priority of provisional patent application 60/072,161 filed Jan. 22, 1998.

BACKGROUND OF THE INVENTION

The present invention relates to a control of a system, machine or process. More particularly, the present invention relates to calculating a model to be used for generating drive signals as input to a vibration or other controlled system.

Vibration systems that are capable of simulating loads and/or motions applied to test specimens are generally known. Vibration systems are widely used for performance evaluation, durability tests, and various other purposes as they are highly effective in the development of products. For instance, it is quite common in the development of automobiles, motorcycles, or the like, to subject the vehicle or a substructure thereof to a laboratory environment that simulates operating conditions such as a road or test track. Physical simulation in the laboratory involves a well-known method of data acquisition and analysis in order to develop drive signals that can be applied to the vibration system to reproduce the operating environment. This method includes instrumenting the vehicle with transducers "remote" to the physical inputs of the operating environment. Common remote transducers include, but are not limited to, strain gauges, accelerometers, and displacement sensors, which implicitly define the operating environment of interest. The vehicle is then driven in the same operating environment, while remote transducer responses (internal loads and/or motions) are recorded. During simulation with the vehicle mounted to the vibration system, actuators of the vibration system are driven so as to reproduce the recorded remote transducer responses on the vehicle in the laboratory.

However, before simulated testing can occur, the relationship between the input drive signals to the vibration system and the responses of the remote transducers must be characterized in the laboratory. Typically, this "system identification" procedure involves obtaining a respective model or transfer function of the complete physical system (e.g. vibration system, test specimen, and remote transducers) hereinafter referred to as the "physical system"; calculating an inverse model or transfer function of the same; and using the inverse model or transfer function to iteratively obtain suitable drive signals for the vibration system to obtain substantially the same response from the remote transducers on the test specimen in the laboratory situation as was found in the operating environment.

As those skilled in the art would appreciate, this process of obtaining suitable drive signals is not altered when the remote transducers are not physically remote from the test system inputs (e.g. the case where "remote" transducers are the feedback variables, such as force or motion, of the vibration system controller).

Although the above-described system and method for obtaining drive signals for a vibration system has enjoyed substantial success, there is a continuing need to improve such systems. In particular, there is a need to improve models of the physical system and the process for obtaining the drive signals.

SUMMARY OF THE INVENTION

An aspect of the present invention relates to a method and apparatus or system controller for controlling a physical system responsive to an input to produce a selected output. The method comprises defining a virtual identity system that includes the physical system for receiving the input to provide an actual output; and checking a quality of identity of the virtual identity system using at least a function of the actual output. The system controller includes program modules to perform the method. Instructions can also be provided on a computer readable medium to implement the method.

BRIEF DESCRIPTION OF THE DRAWINGS

FIGS. 13A and 13B are a block diagram of a fourth aspect of the present invention.

DETAILED DESCRIPTION OF THE PREFERRED EMBODIMENTS

Figure 1:
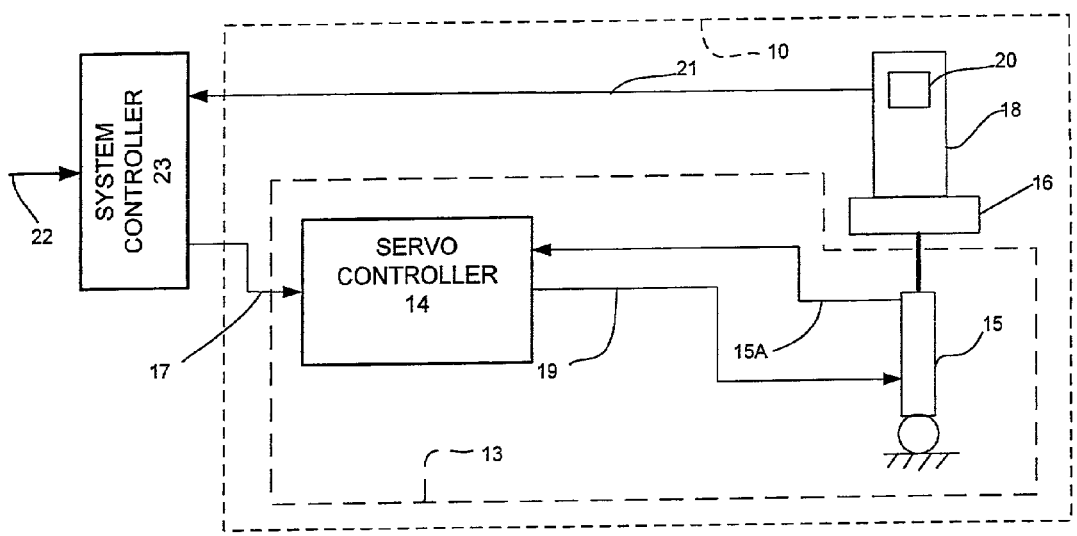
FIG. 1 is a block diagram of an exemplary environment for practicing the present invention.

FIG. 1 illustrates a physical system 10. The physical system 10 generally includes a vibration system 13 comprising a servo controller 14 and an actuator 15. In the schematic illustration of FIG. 1, the actuator 15 represents one or more actuators that are coupled through a suitable mechanical interface 16 to a test specimen 18. The servo controller 14 provides an actuator command signal 19 to the actuator 15, which in turn, excites the test specimen 18. Suitable feedback 15A is provided from the actuator 15 to the servo controller 14. One or more remote transducers 20 on the test specimen 18, such as displacement sensors, strain gauges, accelerometers, or the like, provide a measured or actual response 21. A physical system controller 23 receives the actual response 21 as feedback to compute a drive 17 as input to the physical system 10. In one embodiment of an iterative process discussed below, the physical system controller 23 generates the drive 17 for the physical system 10 based on the comparison of a desired response provided at 22 and the actual response 21 of the remote transducer 20 on the test specimen 18. Although illustrated in FIG. 1 for the single channel case, multiple channel embodiments with response 21 comprising N response components and the drive 17 comprising M drive components are typical and considered another embodiment of the present invention.

Although described herein where the physical system comprises the vibration system 13 and remote transducer 20, aspects of the present invention described below can be applied to other physical systems. For instance, in a manufacturing process, the physical system includes the manufacturing machines (e.g. presses, molding apparatus, forming machines, etc.) and the drive 17 provides command signals to said machines, and the actual response 21 comprises manual or automatic measured parameters of the manufactured article such as a critical dimension. Another example includes an oil refinery where the physical system is the process plant and the actual response 21 comprises intermediate or final parameters related to output products.

Figure 2:
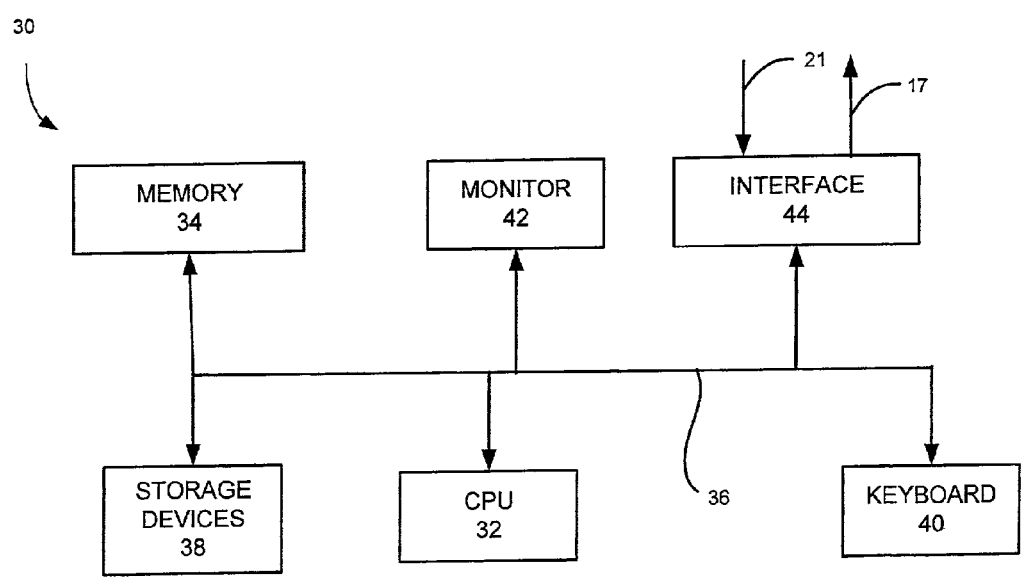
FIG. 2 is a computer for implementing the present invention.

FIG. 2 and the related discussion provide a brief, general description of a suitable computing environment in which the invention may be implemented. Although not required, the physical system controller 23 will be described, at least in part, in the general context of computer-executable instructions, such as program modules, being executed by a computer 30. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions. Moreover, those skilled in the art will appreciate that the invention may be practiced with other computer system configurations, including multi-processor systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 30 illustrated in FIG. 2 comprises a conventional personal or desktop computer having a central processing unit (CPU) 32, memory 34 and a system bus 36, which couples various system components, including the memory 34 to the CPU 32. The system bus 36 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Storage devices 38, such as a hard disk, a floppy disk drive, an optical disk drive, etc., are coupled to the system bus 36 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 34 from at least one of the storage devices 38 with or without accompanying data.

An input device 40 such as a keyboard, pointing device (mouse), or the like, allows the user to provide commands to the computer 30. A monitor 42 or other type of output device is further connected to the system bus 36 via a suitable interface and provides feedback to the user. The desired response 22 can be provided as an input to the computer 30 through a communications link, such as a modem, or through the removable media of the storage devices 38. The drive signals 17 are provided to the physical system 10 of FIG. 1 based on program modules executed by the computer 30 and through a suitable interface 44 coupling the computer 30 to the vibration system 13. The interface 44 also receives the actual response 21.

Before describing the present invention, it may also be helpful to review, in detail, a known method for modeling the physical system 10 and obtaining the drive 17 to be applied thereto. Although described below with respect to a test vehicle, it should be understood that this prior art method and the present invention discussed below are not confined to testing only vehicles, but can be used on other processes, types of test specimens and substructures or components thereof. In addition, the description is done assuming spectral analysis based modeling estimation and implementation though operations can be carried by several other mathematical techniques (e.g. Adaptive Inverse Control (AIC) type models, parametric regression techniques such as Auto Regressive Exogenous (ARX) and State Space types of models, or combinations thereof).

Figure 3A:
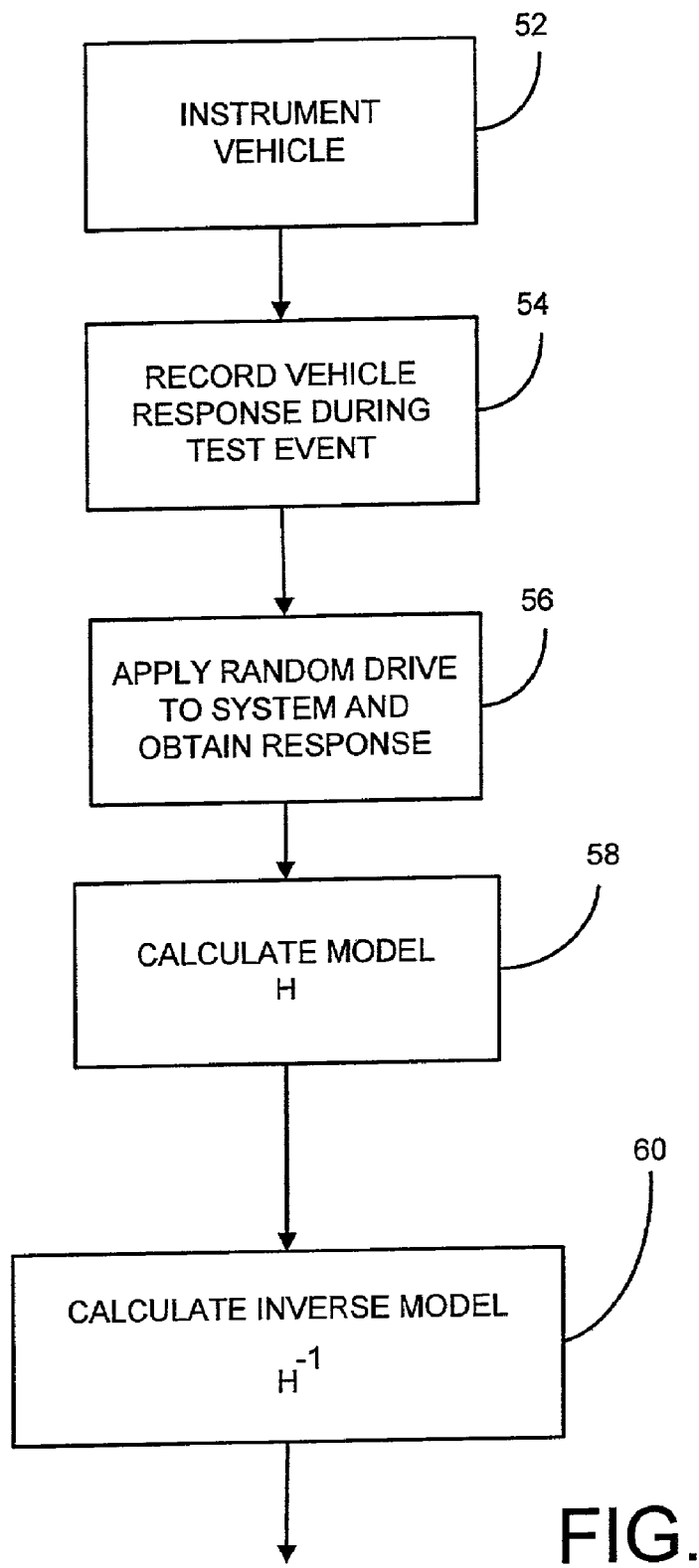
FIG. 3A is a flow chart illustrating the steps involved in an identification phase of a prior art method of vibration testing.

Referring to FIG. 3A, at step 52, the test vehicle is instrumented with the remote transducers 20. At step 54, the vehicle is subjected to the field operating environment of interest and the remote transducer responses are measured and recorded. For instance, the vehicle can be driven on a road or test track. The measured remote transducer responses, typically analog, are stored in the computer 30 in a digital format through analog-to-digital converters, as is commonly known.

Next, in an identification phase, the input/output model of the physical system 10 is determined. This procedure includes providing drive 17 as an input to the physical system 10 and measuring the remote transducer response 21 as an output at step 56. The drive 17 used for model estimation can be random "white noise" having frequency components over a selected bandwidth. At step 58, an estimate of the model of the physical system 10 is calculated based on the input drive applied and the remote transducer response obtained at step 56. In one embodiment, this is commonly known as the "frequency response function" (FRF). Mathematically, the FRF is a N×M matrix wherein each element is a frequency dependent complex variable (gain and phase versus frequency). The columns of the matrix correspond to the inputs, while the rows correspond to the outputs. As appreciated by those skilled in the art, the FRF may also be obtained directly from prior tests using the physical system 10 or other systems substantially similar to the physical system 10.

Figure 3B:
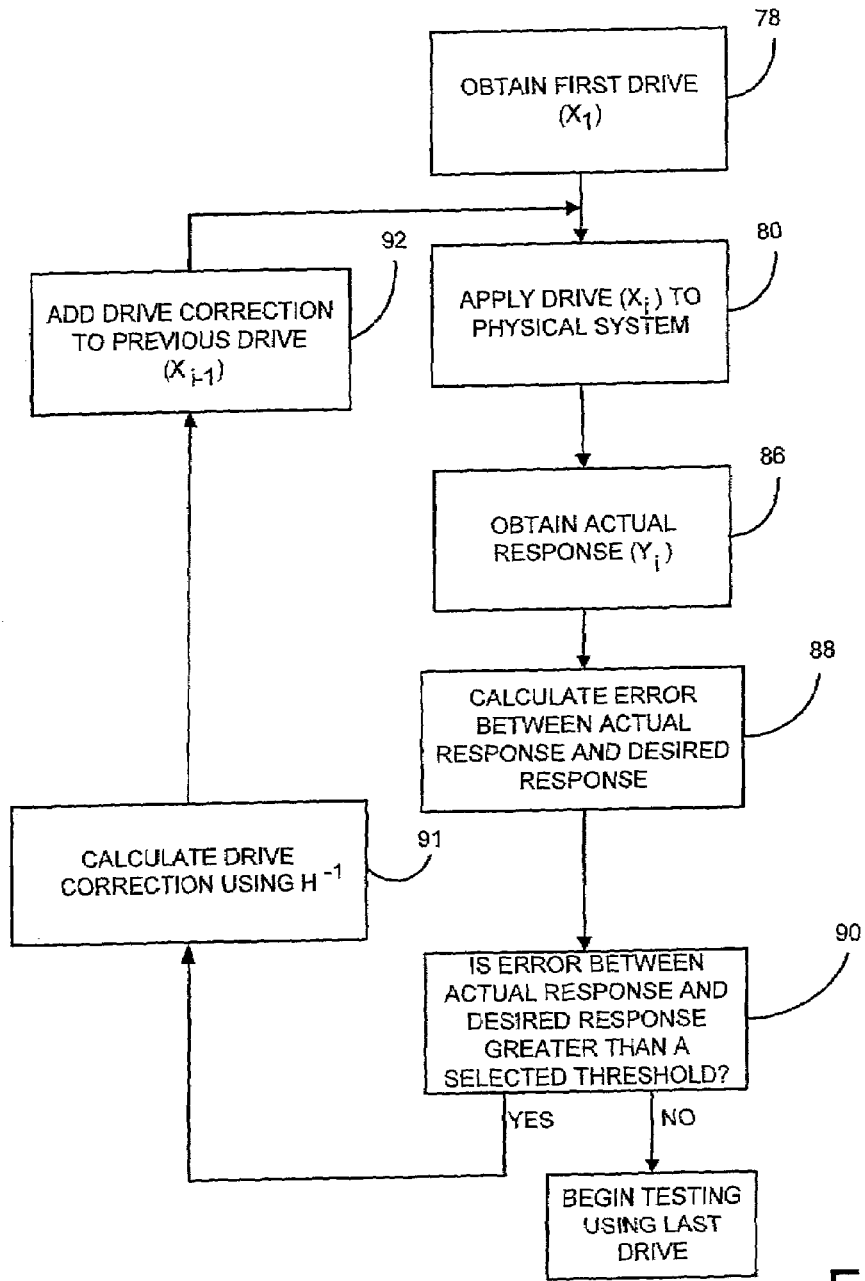
FIG. 3B is a flow chart illustrating the steps involved in an iterative phase of a prior art method of vibration testing.

An inverse model $H(f)^{-1}$ is needed to determine the physical drive 17 as a function of the remote responses at step 60. As appreciated by those skilled in the art, the inverse model can be calculated directly. Also, the term "inverse" model as used herein includes a M×N "pseudo-inverse" model for a non-square N×M system. Furthermore, different forward models H and the inverse models $H(f)^{-1}$ can be used such as regions with "brakes on" and "brakes off" in a spindle coupled vehicle test system. At this point in the prior art, the method enters an iterative phase, illustrated in FIGS. 3B and 4A, to obtain drive 17 which produces actual response 21 that ideally replicates the desired remote transducer response 22 (hereinafter "desired response"). The inverse physical system model $H(f)^{31\ 1}$ is represented at 72, while physical system (vibration system, test vehicle, remote transducers and instrumentation) is represented at 10. Referring to FIG. 3B, at step 78, the inverse model 72 is applied to a target response correction 77 in order to determine an initial drive 17 $x_1(t)$. The target response correction 77 can be the desired response 22 for the initial drive, though most often it is reduced by a relaxation gain factor 95. The calculated drive 17 $x_1(t)$ from the inverse model 72 is then applied to the physical system 10 at step 80. The actual remote transducer response 21 (hereinafter "actual response") $y_1(t)$ of the physical system 10 to the applied drive 17 $x_1(t)$ is then obtained at step 86. If the complete physical system 10 is linear (allowing a relaxation gain 95 of unity), then the initial drive 17 $x_1(t)$ could be used as the required drive. However, since physical systems are typically non-linear, the correct drive 17 has to be arrived at by an iterative process. (As appreciated by those skilled in the art, drive 17 used in previous tests for a similar physical system may be used as the initial drive.)

The iterative process involves recording the first actual response $y_1(t)$ resulting from the initial drive $x_1(t)$ and comparing it with the desired response 22 and calculating a response error 89 $\Delta y_1$ as the difference at step 88. (The first actual response signal $y_1(t)$ is provided at 87 in FIG. 4A.) The response error 89 $\Delta y_1$ is compared to a preselected threshold at step 90 and if the response error 89 exceeds the threshold an iteration is performed. Specifically the response error 89 $\Delta y_1$ is reduced by the relaxation gain factor 95 to provide the new target response correction 77. In this embodiment, the inverse transfer function $H(f)^{-1}$ is applied to the new target response correction 77 to create a drive correction $\Delta x_2$ 94 (step 91) that is added to the first drive $x_1(t)$ 17A to give a second drive $x_2(t)$ 17 at step 92. The iteration process (steps 80–92) is repeated until the response error 89 is brought down below the preselected threshold on all channels of the response. The last drive 17, which produced a response 21, that was within the predetermined threshold of the desired response 22, can then be used to perform specimen testing.

As described, the response error 89 $\Delta y$ is commonly reduced by the relaxation gain factor (or iteration gain) 95 to form the target response correction 77. The iteration gain 95 stabilizes the iterative process and trades off rate-of-convergence against iteration overshoot. Furthermore, the iteration gain 95 minimizes the possibility that the test vehicle will be overloaded during the iteration process due to non-linearities present in the physical system 10. As appreciated by those skilled in the art, an iteration gain can be applied to the drive correction 94 $\Delta x$ and/or the response error 89. It should be noted in FIG. 4A that storage devices 38 can be used to store the desired response 22, the actual responses 21 and previous drives 17A during the iterative process. Of course, memory 34 can also be used. Also, a dashed line 93 indicates that the inverse model 72 is an estimate of the inverse of the physical system 10. The block diagram of FIG. 4A, as discussed above, can be implemented by those skilled in the art using commercially available software modules such as included with RPCIII™ from MTS Systems Corporation of Eden Prairie, Minn.

Figure 3C:
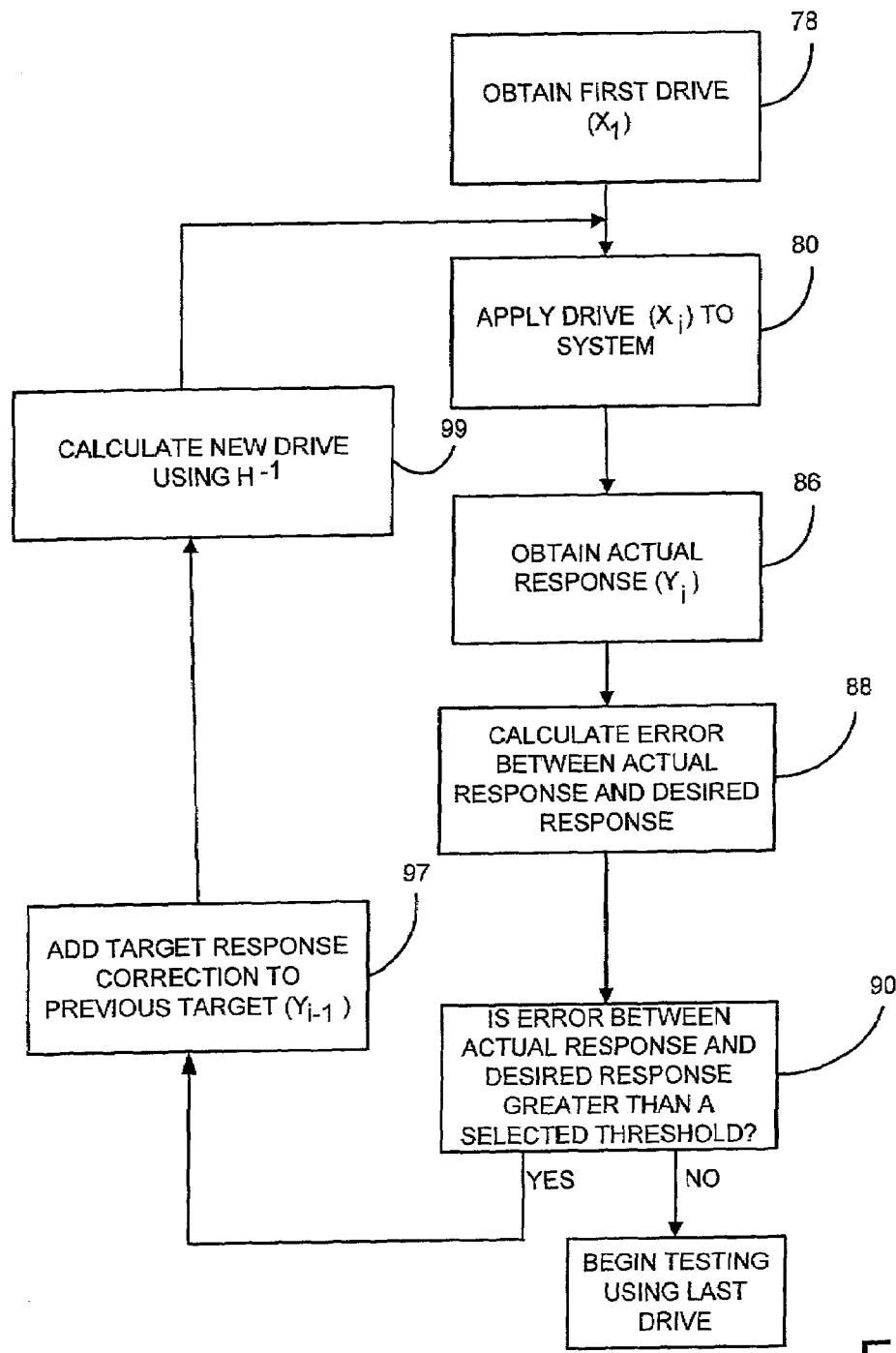
FIG. 3C is a flow chart illustrating the steps involved in another iterative phase of a prior art method of vibration testing.
Figure 4A:
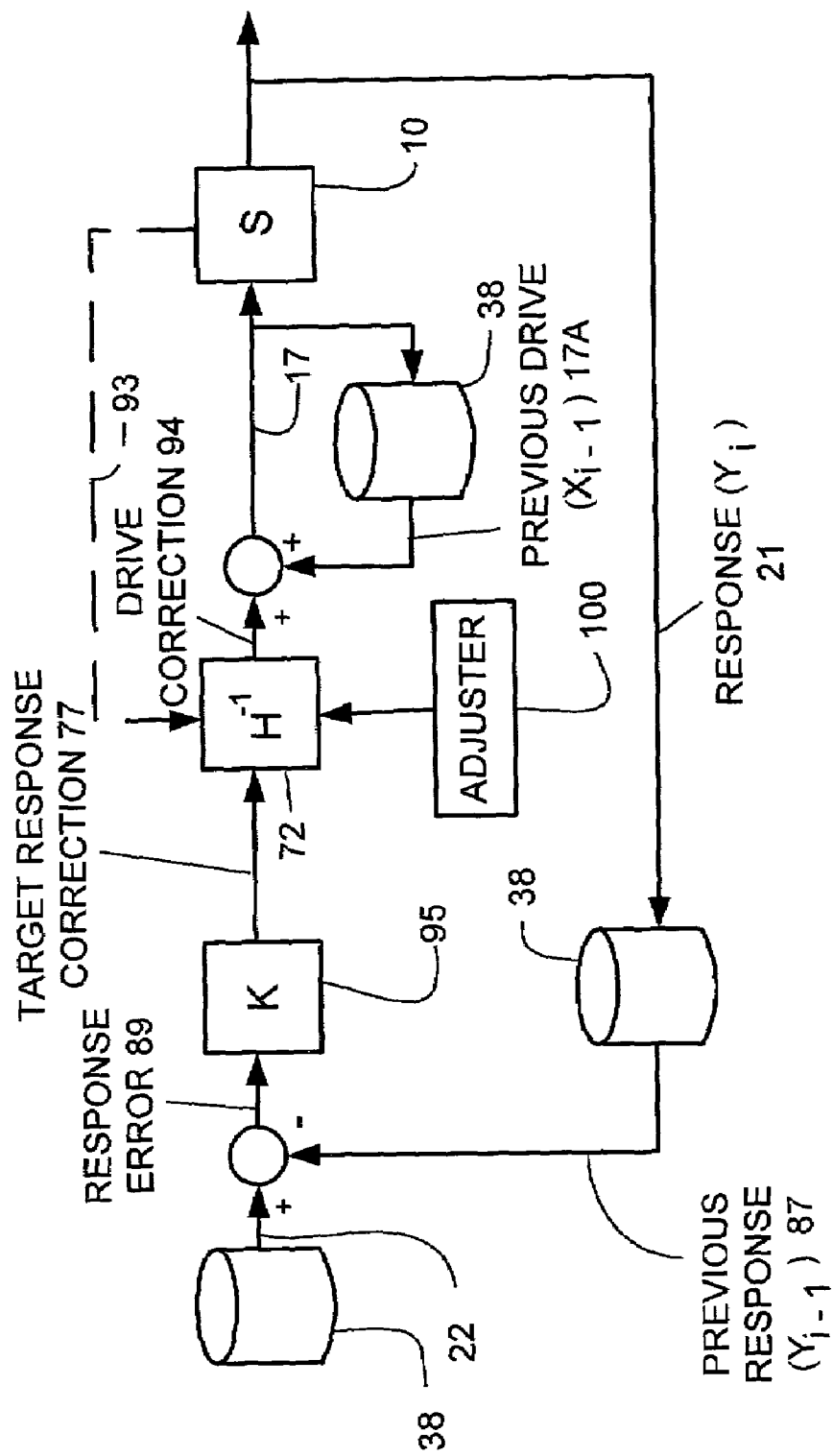
FIG. 4A is a detailed block diagram of a prior art iterative process for obtaining drive signals for a vibration system with an adjuster of the present invention.
Figure 4B:
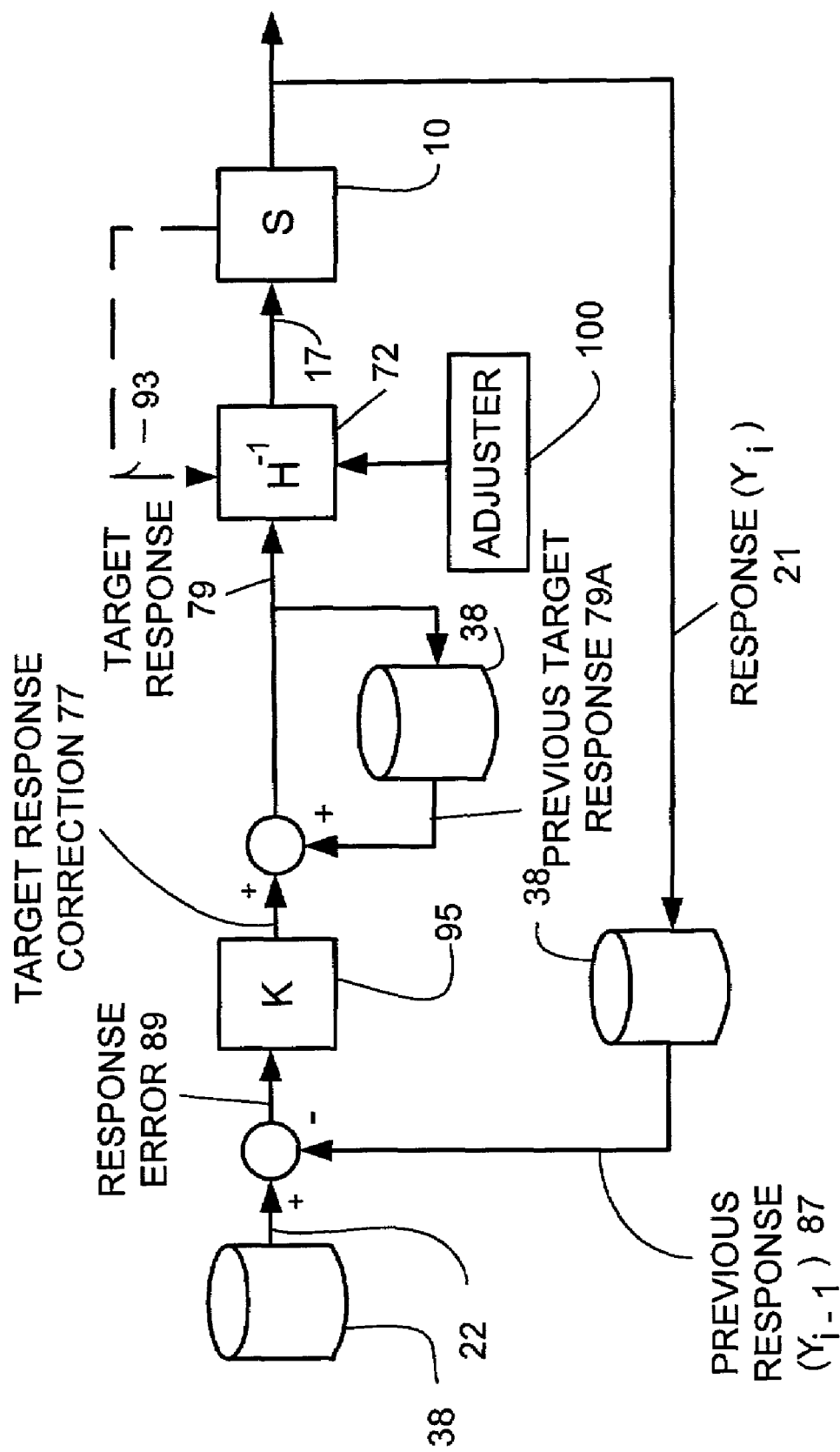
FIG. 4B is a detailed block diagram of another prior art iterative process for obtaining drive signals for a vibration system with the adjuster of the present invention.

At this point, a modified method of the prior art for calculating the drive can also be discussed. The modified prior art method includes the steps of the identification phase illustrated in FIG. 3A and many of the steps of the iterative phase illustrated in FIG. 3B. For convenience, the iterative steps of the modified method are illustrated in FIG. 3C and the block diagram as illustrated in FIG. 4B. As illustrated in FIG. 4B, the calculation of the target response correction 77 is identical. However, if the response error 89 between the actual response 21 and the desired response 22 is greater than a selected threshold, then the target response correction 77 is added to a previous target response 79A at step 97 to obtain a new target response 79 for the current iteration. The inverse model 72 is applied to the target response 79 to obtain the new drive 17. As illustrated in FIG. 4B, the iteration gain 95 can be used for the reasons discussed above.

Generally, an aspect of the present invention includes the response time history error iteration loop described above with respect to FIGS. 4A and 4B, while including an adjuster 100 that operates during each step of the iterative process, to improve the physical system inverse model 72. As illustrated in FIG. 4A, the adjuster 100 corrects the inverse model 72 which receives the target response correction 77 directly as a simple function of the response error 89 (i.e. without previous target information 79A of FIG. 4B) and where the physical system drive 17 comprises drive correction 94 in combination with a previous drive 17A. Conversely, as illustrated in FIG. 4B, the inverse model 72 receives the target response 79 as the combination of the target response correction 77 and the previous target response 79A, and drive 17 is directly obtained by applying the inverse model 72. In the case of FIG. 4B, the adjuster 100 corrects the inverse model 72 in a conceptually identical fashion as in FIG. 4A. However, as will be discussed below, the configurations of FIGS. 4A and 4B render different signals available to the virtual identity modeling process each with inherent situational advantages. Furthermore, as will be described below, the adjuster 100 can also operate in an iterative manner.

Figure 5:
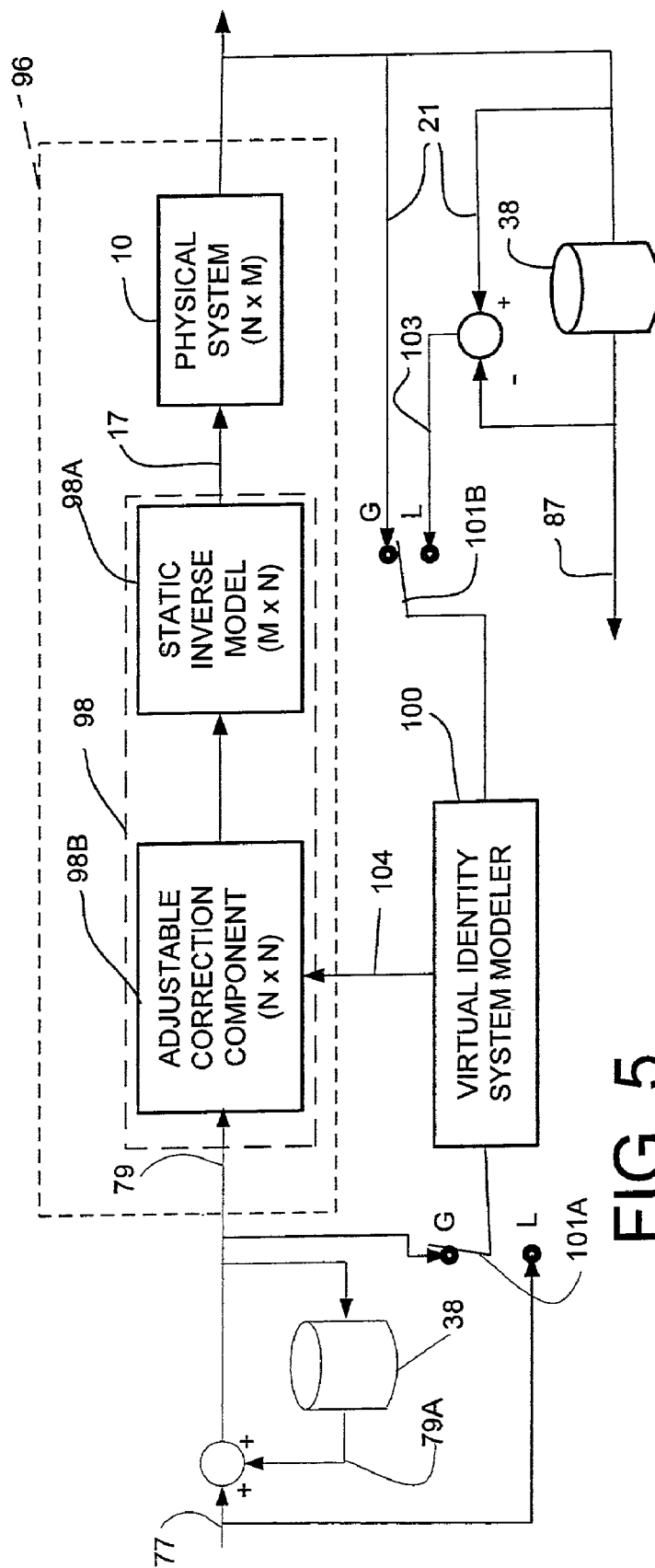
FIG. 5 is a general block diagram of an aspect of the present invention.
Figure 8:
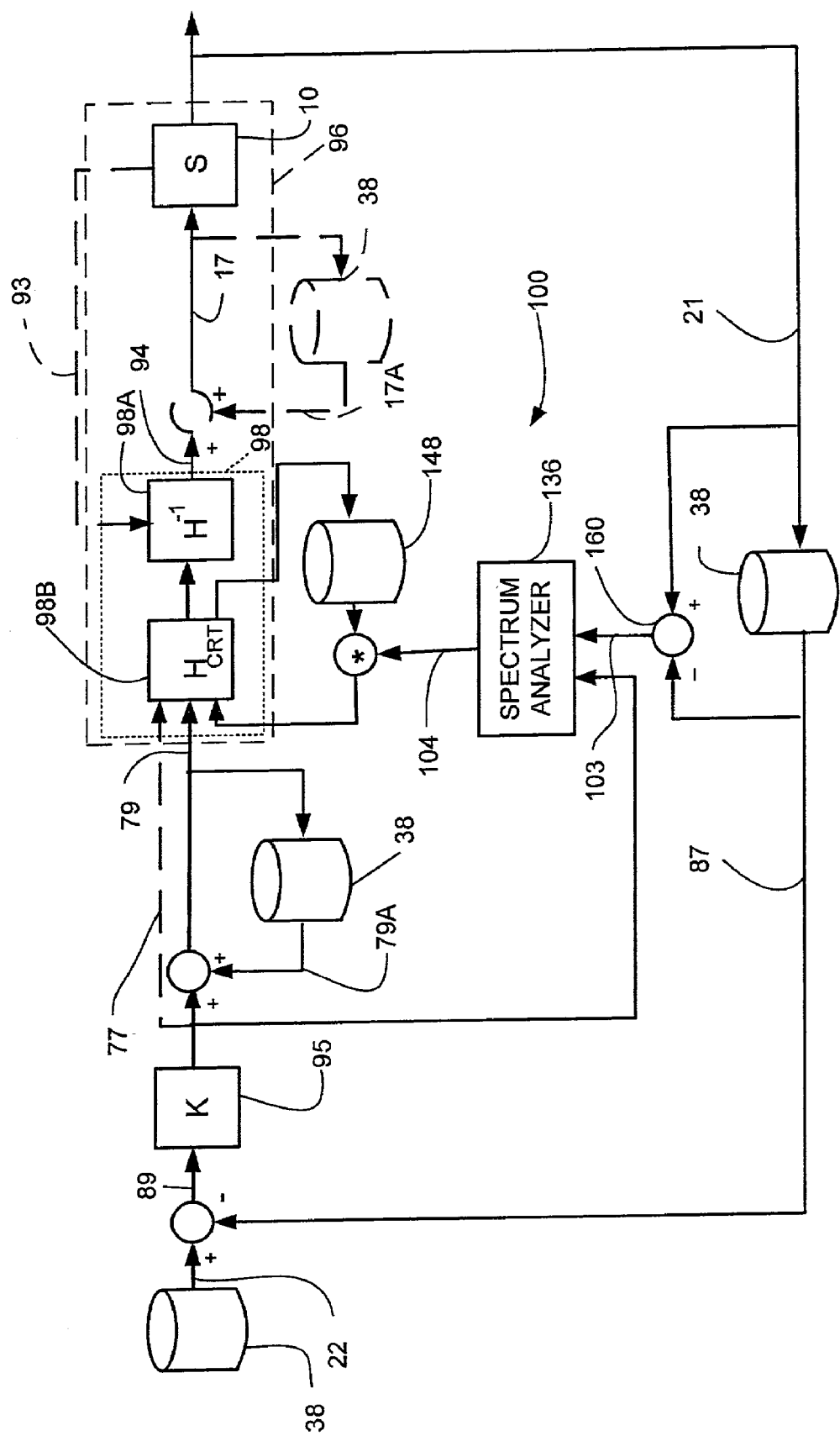
FIG. 8 is a detailed block diagram of another embodiment of the invention of FIG. 5.

An aspect of the present invention is illustrated in the block diagram of FIG. 5. Generally, this aspect of the invention includes a method of controlling the physical system 10 to produce an actual response 21 that ideally matches the desired response 22 consistent with the prior art as discussed. The method includes generating an inverse model 98 (e.g. the inverse transfer function $H(f)^{-1}$) of the physical system 10, wherein the inverse model 98 is applied to the target response 79 to obtain the drive 17 intended to generate the desired response 22 from the physical system 10 as the actual response 21. As will be described below with respect to FIG. 6, the target response correction 77 can be combined with the previous target response 79A, when the inverse model 98 is applied to the target response 79 to realize the complete drive 17. Alternatively, as illustrated in FIG. 8 with dashed lines, the inverse model 98 can be applied to the target response correction 77 directly to realize the drive correction 94, which is then subsequently combined with the previous drive 17A to provide a new drive 17 for the physical system 10.

Referring back to FIG. 5, the adjuster 100 can comprise a virtual identity system modeler that checks a quality of identity of the inverse model 98 in combination with the physical system 10. The combination of the inverse model 98 and the physical system 10 is designated as a virtual identity system 96. The quality of identity, as measured by the virtual identity system modeler 100, assesses the accuracy of the physical system 10 model relative to the operating characteristics of the physical system 10. In this embodiment, the quality of identity is measured via the series connection of the physical system 10 with the inverse system model 98. When the inverse system model 98 identically matches the physical system 10, the quality of identity calculation produces an identity result, indicating an ideal inverse system model estimate.

The advantage of this approach is that a model of a potential correction to the physical system inverse model that improves the quality of the virtual identity system can take a simpler form than the inverse model itself. Consequently, the model correction is much easier to obtain than a new estimate of the complete inverse system model. This approach leads to a straightforward algorithmic formulation of such a correction model estimate (e.g. the FRF between the target response and the actual response). The simple form of this modeling technique allows smaller segments of noisier and more correlated data to be used, thereby providing an advantage in an adaptive environment for either non-parametric (spectrum analysis, etc.) or parametric (ARX, etc.) modeling methods.

In one embodiment of FIG. 5, with switches 101A and 101B at position "G", the virtual identity system modeler 100 compares the target response 79 and the actual response 21. In another embodiment with switches 101A and 101B at position "L", the virtual identity system modeler 100 compares the target response correction 77 and an actual response correction 103 (difference between response $y_i$ and response $y_{i-1}$) obtained from application of the drives 17 to the physical system 10 for successive iterations. In either embodiment, the virtual identity system modeler 100 subsequently adapts the inverse model 98 as a function of the quality of identity from iteration to iteration. In other words, the virtual identity system modeler 100 provides as an output, model (e.g. FRF) correction values 104 to adjust at least some of the values present in the inverse model 98. In both of these preferred embodiments, the correction values 104 are derived on a channel-by-channel basis, a natural simplification facilitated by the virtual identity system. Cross-coupling effects do not then form part of the correction values 104, although all terms of the inverse model 98 will generally change when the correction values 104 are applied. These preferred embodiments however do not preclude the option of including some or all cross-coupling terms into the correction values 104.

It should be understood that switches 101A and 101B represent selection of the type of data provided to the virtual identity system modeler 100 and are not typically a physical electrical switch. Rather, switches 101A and 101B represent software routines or modules used to acquire and provide the selected data to the virtual identity system modeler 100.

In FIG. 5, the inverse model 98 includes a static inverse model component 98A and an adjustable component 98B. The static component 98A is similar to the inverse model 72, discussed above. For instance, the static component 98A can be the inverse model $H(f)^{-1}$ that was calculated by taking the inverse of forward model H(f) at step 58 (FIG. 3A). The static component 98A of the inverse model typically comprises a M×N matrix that includes cross-coupling effects, where M is the number of inputs (drive 17) and N is the number of outputs (actual response 21).

The adjustable component 98B receives the inverse model correction values 104 from the virtual identity system modeler 100 for purposes of iteratively adapting the inverse model 98 to the current operating conditions. In one embodiment, the adjustable component 98B comprises an N×N matrix with correction values for each of the N channels located on the diagonal and all other values (off-diagonal) equal to zero.

Figure 6:
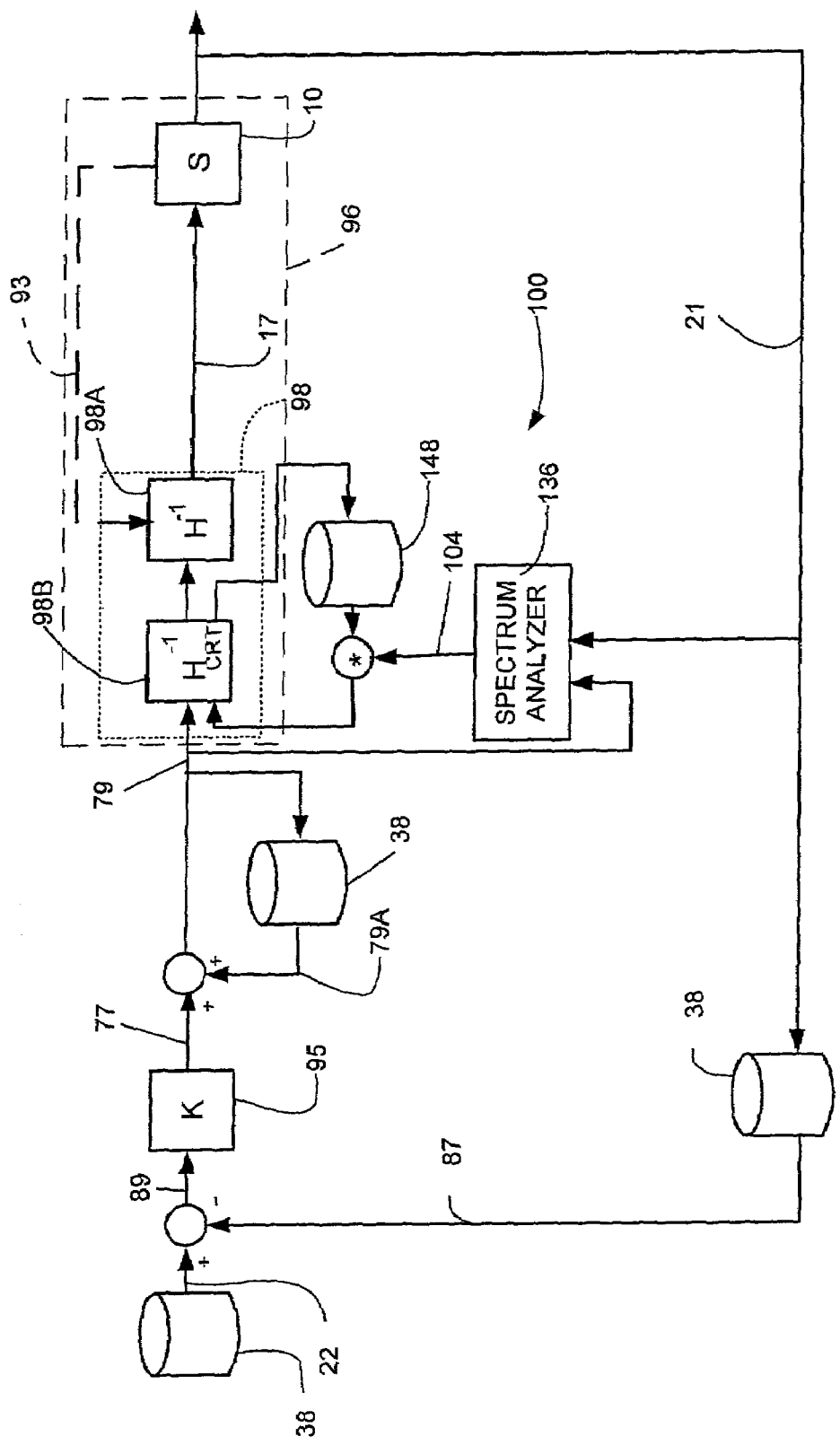
FIG. 6 is a detailed block diagram of an embodiment of the invention of FIG. 5.

FIG. 6 is an embodiment of the functionality discussed in FIG. 5 in the context of the overall iterative control process detailed in FIG. 4B. Relative to FIG. 4B, in FIG. 6, the inverse model 98 is extended to include the static component 98A and the adjustable component 98B of FIG. 5.

Figure 7:
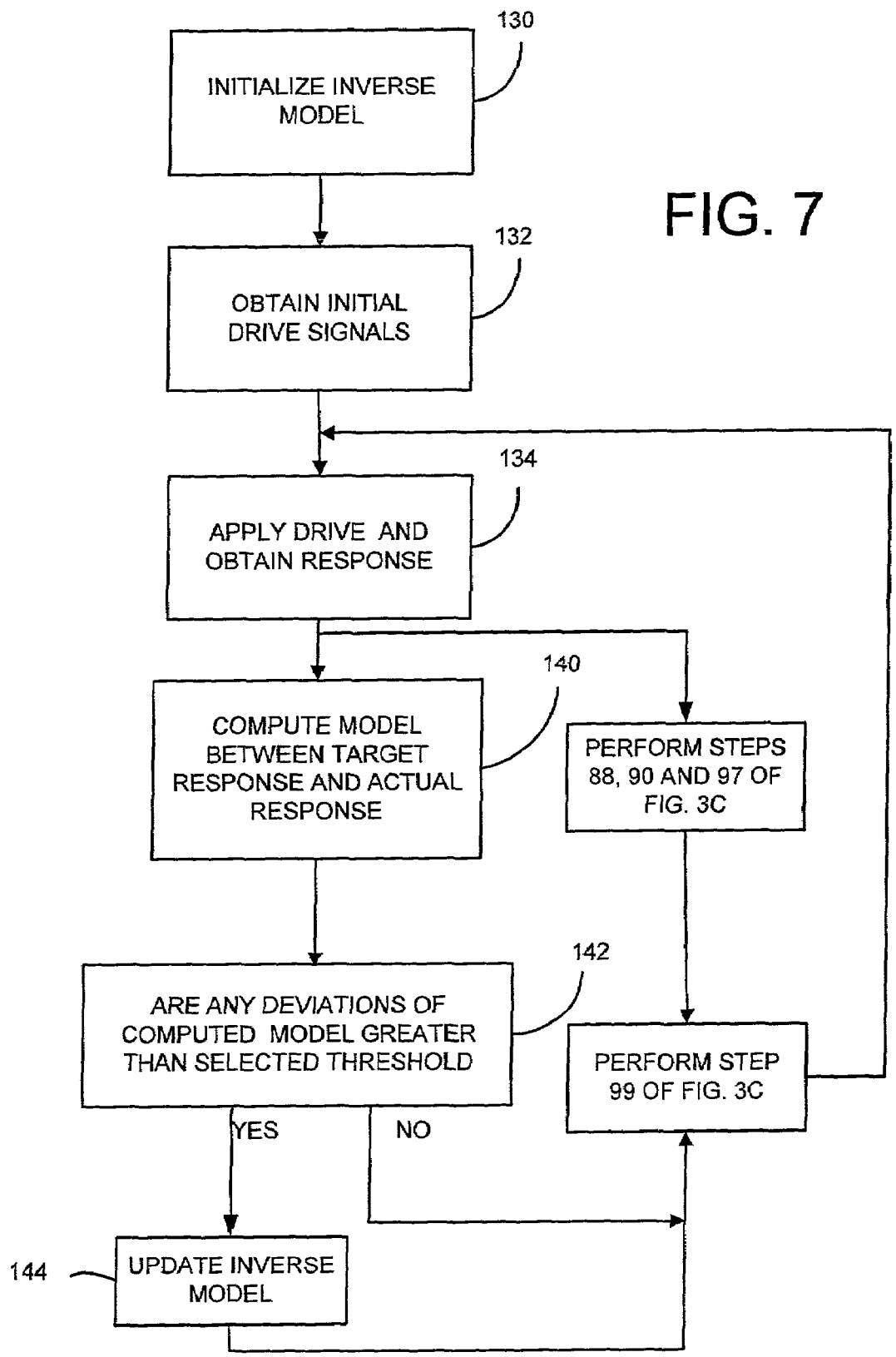
FIG. 7 is a flow chart illustrating the steps involved for operating the embodiment of FIG. 6.

FIG. 7 illustrates a method of operation for the embodiment of FIG. 6. At step 130, the inverse model 98 is initialized. This step includes initialization of the static component 98A as discussed above with respect to the method of FIG. 3A (step 58), and initialization of the adjustable component 98B, which for the first iteration is typically an identity model. In other words, the adjustable component 98B has no effect during the first iteration.

At step 132, the initial drive 17 is obtained by convolving the target response 79 with the inverse model 98. In view that the inverse model 98 includes the static component 98A and the adjustable component 98B, the target response 79 is first convolved with the adjustable component 98B, the output of which is then convolved with the static component 98A. In certain cases, the static component 98A and the adjustable component 98B can be combined subsequently, requiring a single convolution. At step 134, the drive 17 is applied to the physical system 10 wherein the actual response 21 is measured and recorded.

Having obtained the actual response 21 of the physical system 10 from the initial drive 17, the virtual identity system modeler 100 performs spectral analysis between the target response 79 and the actual response 21. In the embodiment illustrated in FIG. 6, the virtual identity system modeler 100 includes a spectrum analyzer 136 that receives the target response 79 and the actual response 21. In one embodiment, the spectrum analyzer 136 calculates an FRF between the target response 79 and the actual response 21 on a channel-by-channel basis. This is represented at step 140. In other words, this step calculates a quality of the identity of the inverse model 98 and the physical system 10 (i.e. the virtual identity system 96). The values 104 (FIG. 6) are corrections to the inverse model 98. At step 142, the deviation of the FRF from identity is determined and if one or more of the deviations exceed the corresponding selected threshold, values on the diagonal of the adjustable component 98B are updated at step 144. This is represented in FIG. 6 where previous values of the adjustable component 98B stored at 148 are combined with new values provided by the spectrum analyzer 136, iteratively correcting the adjustable component 98B.

At this point, it should be noted that steps 88, 90, 97 and 99 of FIG. 3C are still performed in order to obtain the refined drive 17. However, before the new drive 17 is calculated at step 99, the inverse model is updated at step 144.

In the overall iterative process, steps 134, 140, 142 and 144 are only repeated as necessary when deviations in the model between the actual response 21 and the target response 79 are greater than the selected model threshold. Steps 88, 90, 97 and 99 of FIG. 3C are performed independently for each iteration until the error threshold of step 90 is realized.

It should be understood by those skilled in the art that although the virtual identity system modeler 100 and corresponding inverse model 98 are described in terms of spectral analysis methods, other mathematical models and model regression techniques, either parametric or non-parametric, can be employed as desired in selected combinations (e.g. AIC, ARX, ARMA, State Space).

FIG. 8 illustrates an alternative embodiment where the actual response correction 103 is compared to the target response correction 77 and is used as a basis for updating the values of the adjustable component 98B. In FIG. 8, a summer 160 is used to obtain a difference between the actual response 21 and the immediately preceding actual response 87 (i.e. the actual response correction 103). During the iterative process, the spectrum analyzer 136 calculates an FRF between the target response correction 77 and the actual response correction 103 in order to update the adjustable component 98B.

In FIG. 8, target response correction 77 is added to the previous target response 79A to form the new target response 79 for each iteration. As appreciated by those skilled in the art, the target response correction 77 alone can be convolved with the inverse model 98 to form the corresponding drive correction 94, which can be combined with the previous drive 17A to form new drive 17. Formation of the new drive 17 in this manner does not alter the comparison by the spectrum analyzer 136

Figure 9:
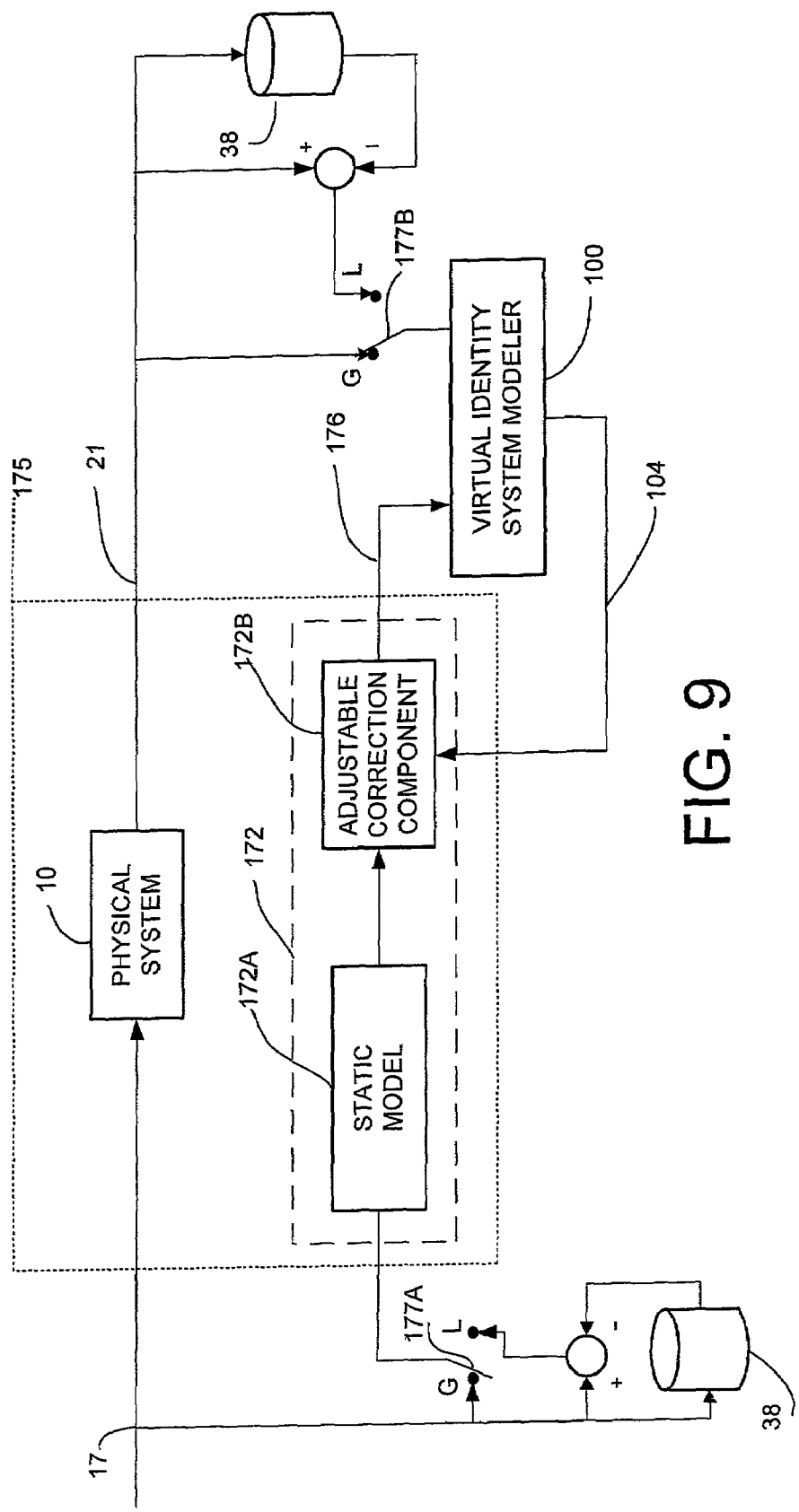
FIG. 9 is a general block diagram of a second aspect of the present invention.
Figure 10:
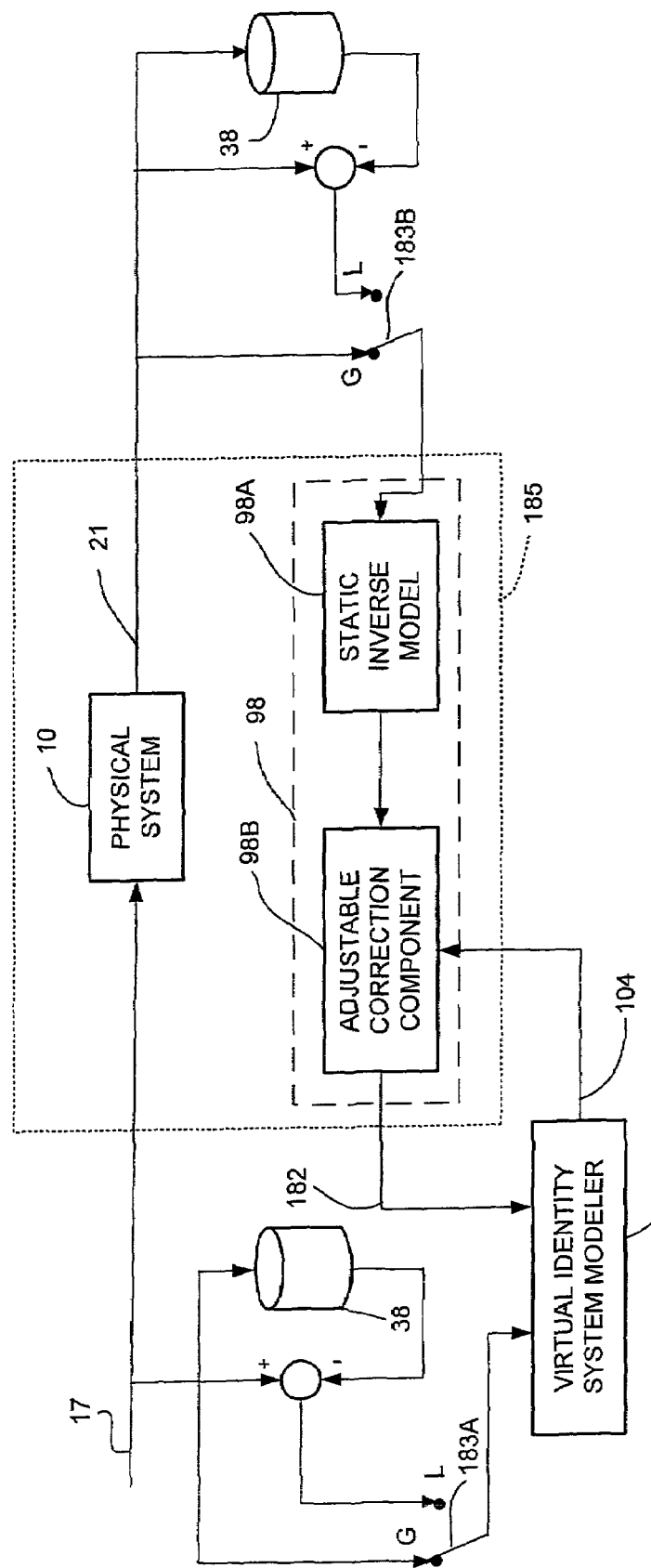
FIG. 10 is a general block diagram of a third aspect of the present invention.

Other general aspects of the present invention are illustrated in FIGS. 9 and 10. For cases where the target response 79 (or target response correction 77) does not exist in the forward iteration control loop, it can be explicitly computed with mathematical equivalence as demonstrated in FIG. 9. In FIG. 9, drive 17 is applied to the physical system 10 and to a forward model 172 of the physical system 10, wherein a virtual identity system is indicated by dashed lines 175. It can be shown that virtual identity system 175 is mathematically equivalent to the virtual identity system 96 of FIG. 5.

The actual response 21 from the physical system 10 and a modeled target response 176 from the forward model 172 are provided to the virtual identity system modeler 100. In one embodiment, the virtual identity system modeler 100 performs spectrum analysis between the actual response 21 and the modeled target response 176 to check the quality of identity of virtual identity system 175, since signal 176 is equal to either signal 79 or signal 77 of FIG. 5, depending on the position of switch 177A. The virtual identity system modeler 100 subsequently adjusts the model 172 accordingly as a function of the quality of identity.

In the embodiment illustrated, the model 172 includes a static component 172A and an adjustable component 172B. The static component 172A can be obtained per step 58 of FIG. 3A. The static component 172A typically comprises a N×M model that includes cross-coupling terms.

The virtual identity system modeler 100 provides correction values 104 to the adjustable component 172B. In one embodiment, the adjustable component 172B comprises a N×N diagonal model.

In a manner similar to FIG. 5, switches 177A and 177B allow the inputs to the virtual identity system modeler 100 to be either the modeled target response and the actual response or the modeled target response corrections and the actual response corrections. Those skilled in the art will recognize that switch 177A and associated summer and storage device could also be applied in the data path between the static model 172A and the adjustable component 172B rather than operating on the drive 17 as illustrated. Likewise, the switch 177A and associated summer and storage device can also be applied to the modeled target response 176 in some circumstances.

Alternatively, a similar implementation that could have preferred characteristics, potentially such as when N and M are unequal with the number of outputs or responses N greater than the number of inputs or drives M, is illustrated in FIG. 10. In FIG. 10, a virtual identity system is indicated by dashed lines 185 and comprises physical system 10 and inverse model 98. However, the quality of the identity is ascertained by comparing drive 17 applied to the physical system 10 with a corresponding modeled drive signal 182 obtained from the inverse model 98. Note in this case, the virtual identity system 185 is formed with respect to drive signals as opposed to the use of response signals as in other embodiments. The actual response 21 is obtained from the physical system 10 when the drive 17 is applied thereto. The actual response 21 is then provided as an input to the inverse model 98. In one embodiment, the virtual identity system modeler 100 performs spectrum analysis between the drive 17 and the modeled drive 182 for successive iterations. The virtual identity system modeler 100 subsequently adjusts the inverse model 98 and, more particularly, the adjustable component 98B.

In a manner similar to FIGS. 5 and 9, switches 183A and 183B allow the inputs to the virtual identity system modeler 100 to be either the drive 17 and the modeled drive 182 (as illustrated with switches 183A and 183B in the "G" position), or the drive corrections 94 and the modeled drive corrections (as illustrated with the switches 183A and 183B in the "L" position). Those skilled in the art will be able to recognize that switch 183B and associated summer and storage device can also be applied in the data path between the static inverse model 98A and the adjustable component 98B rather than operating on the actual response 21, as illustrated. Likewise, the switch 183B and associated summer and storage device can be applied to the modeled drive signal 182 in some circumstances.

Figure 11:
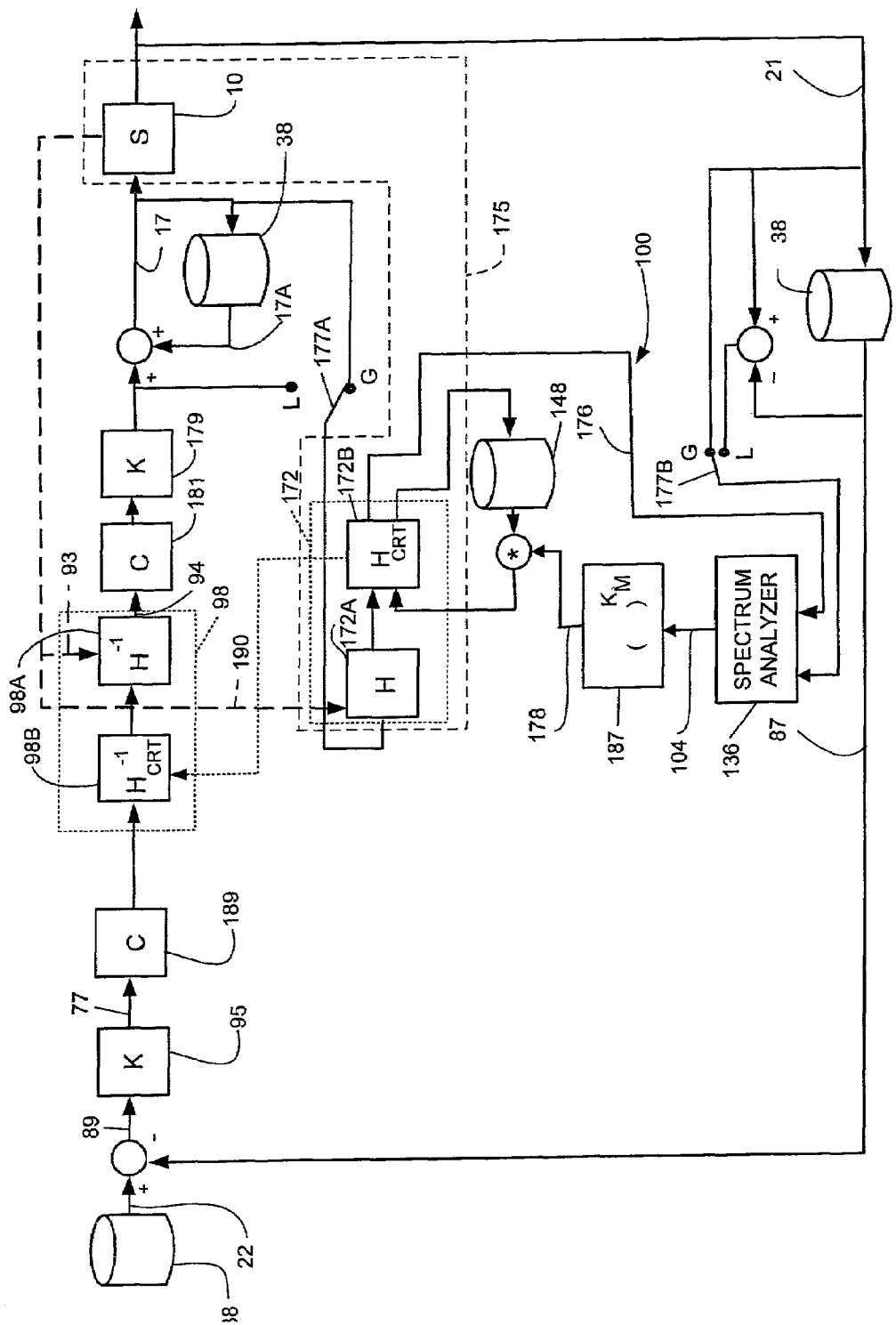
FIG. 11 is a detailed block diagram of an embodiment of the invention of FIG. 9.

FIG. 11 is an embodiment of the functionality discussed in FIG. 9 in the context of the iterative adaptive process of FIG. 8 where the same reference numerals have been used to identify identical components. FIG. 11 further includes relaxation gain 179 and frequency weighting function 181. Relaxation gain 179 is similar to relaxation gain 95, but provides gain on the drive correction 94 rather than on the response error 89. Frequency weighting function 181 can be manually defined as well as computed from coherence type quantities (as indicated by "C" in 181) or other measures of model quality, generally as, but not limited to a function of frequency. An example of a coherence type quantity for frequency weighting of the drive correction 94 at 181 can be formulated as $[H2]^{-1}*[H1]$, where H1 is a forward system model for the physical system 10 assuming noise on the inputs, and H2 is a forward system model assuming noise on the outputs. Similarly, frequency weighting (e.g. $[H1]*[H2]^{-1}$) on the responses can be provided at 189, if desired.

The presence of either relaxation gain 179 or frequency weighting 181, or other such functions, between the inverse model 98 and the physical system 10, breaks up the virtual identity system 96 of the forward iteration loop illustrated in FIG. 5. Therefore, in the embodiment of FIG. 11, the virtual identity system 175 is explicitly constructed per the illustration of FIG. 9.

Referencing FIG. 11, the forward model 172 includes the static forward model 172A and the adjustable component 172B of the physical system 10. Per step 58 of FIG. 3A, the static forward model 172A is determined; it's association with the physical system 10 is represented in FIG. 11 by dashed line 190. With the static forward model 172A determined, the static inverse model 98A of the physical system 10 is then calculated, the association being represented by dashed line 93. Both the forward adjustable component 172B and inverse adjustable component 98B are then initialized with diagonal elements set to one and off-diagonal elements set to zero.

Initial drive 17 is obtained consistent with the method discussed above. The initial drive 17 is then applied to the physical system 10 wherein the actual response 21 is measured and recorded. As illustrated, the initial drive 17 is also applied to the forward model 172 to generate the modeled response 176 (an equivalent response to the target response 79 of FIGS. 6 and 8 with switches 177A and 177B in the "G" position).

The virtual identity system modeler 100 compares the actual response 21 to the modeled response 176. In the embodiment illustrated, the virtual identity system modeler 100 comprises the spectrum analyzer 136 and performs spectral analysis between the actual response 21 and the modeled response 176 on a channel-by-channel basis. Consistent with previous embodiments, the deviation of the FRF from identity is then determined by the spectrum analyzer 136 and if one or more of the deviations exceed the corresponding selected threshold, values on the diagonal of the adjustable component 172B are updated. By simply taking the inverse of the adjustable component 172B, values for the adjustable component 98B can be easily calculated for the next iteration, which begins with the calculation of the response error 89.

A relaxation gain 187 can provide stabilization of the model update iteration loop. The relaxation gain 187 can be applied to correction values 104 as a "power" $k_m$, thereby creating relaxed correction values 178 that are applied to the model correction 172B. Note, also, that the relaxation gain 187 gain can be incorporated in any of the embodiments discussed in this application.

Figure 12:
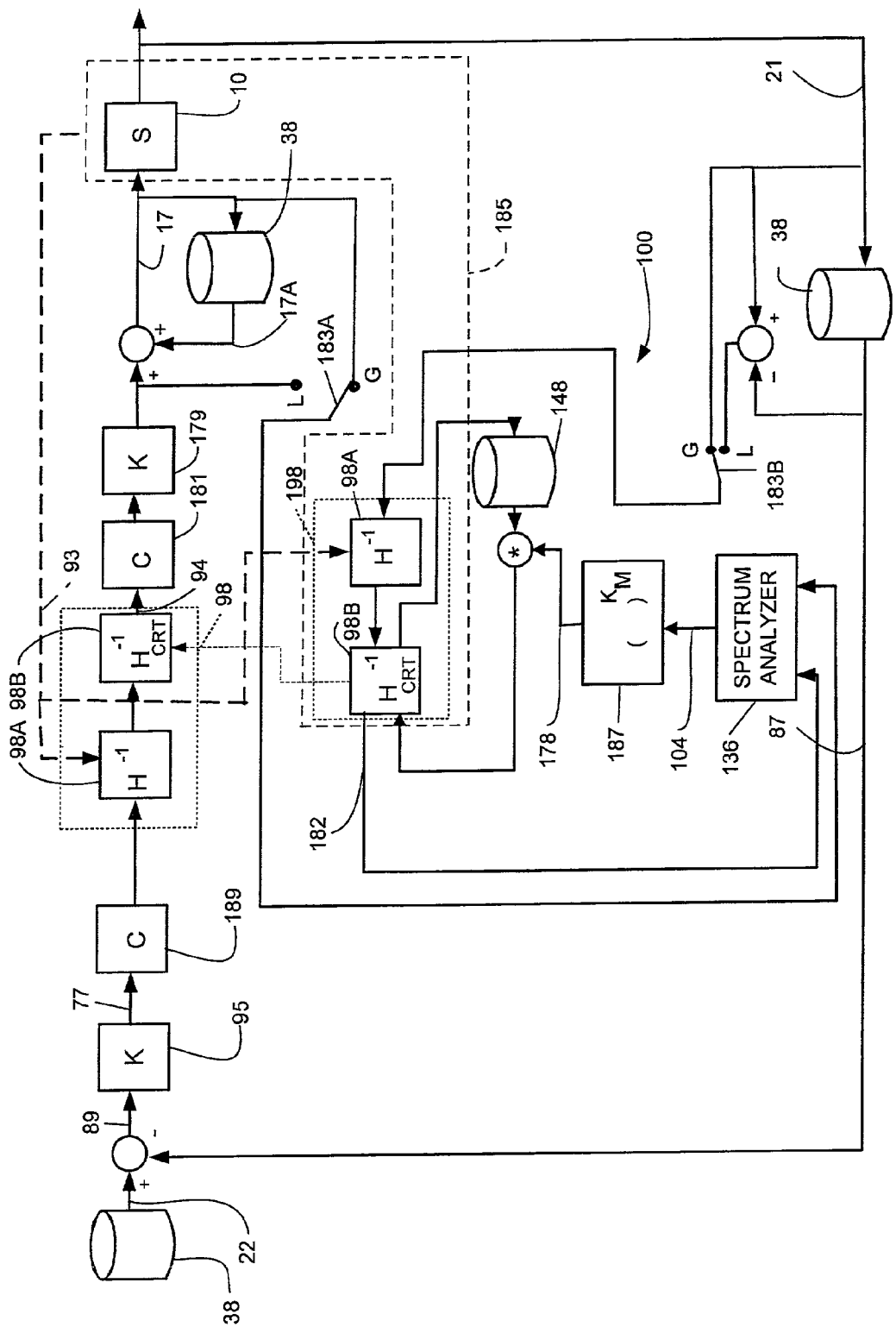
FIG. 12 is a detailed block diagram of an embodiment of the invention of FIG. 10.

FIG. 12 is an exemplary embodiment for generating drive signals using the virtual identity system modeler 100 described above with respect to FIG. 10, where the same reference numerals have been used to identify identical components of previous embodiments. As in FIG. 10, the virtual identity system 185 is characterized using drive signals. The virtual identity system modeler 100 checks the quality of the identity by comparing drive 17 applied to the physical system 10 with a corresponding modeled drive 182 obtained from an inverse model 198. The inverse model 198 is identical to the inverse model 98 and comprises the static component 98A and the adjustable component 98B. The embodiment of FIG. 12 operates in a manner similar to the embodiments of FIGS. 6 and 8 wherein the virtual identity system modeler 100 (including the spectrum analyzer 136) adjusts the inverse model 198 by providing update values (herein relaxed correction values 178) to the adjustable component 98B thereof. However, in this embodiment, the adjustable component 98B of the inverse model 98 is also updated in accordance with changes made to the adjustable component 98B of the inverse model 198.

Figure 13A:
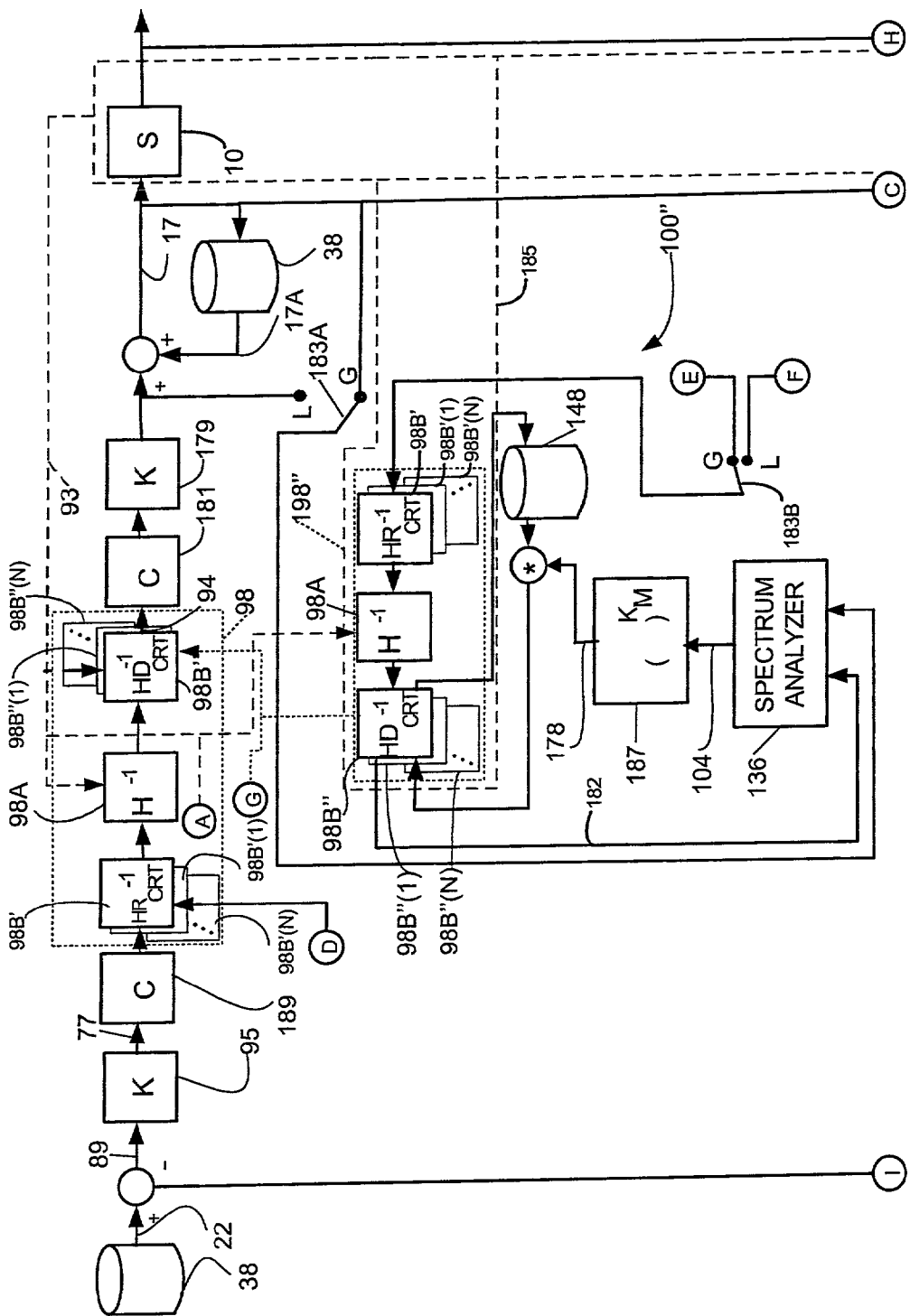

In yet a further embodiment illustrated in FIGS. 13A and 13B, the model 98 is adjusted for each iteration through both the use of an adjustable component 98B' based on comparing the actual response 21 to the modeled response 176 obtained from a forward model 172', as well as through the use of an adjustable component 98" based on comparing drive 17 applied to the physical system 10 with a corresponding modeled drive 182 obtained from an inverse model 198". In particular, a virtual identity system modeler 100' operates in a manner consistent with the embodiment of FIG. 11 to adjust adjustable component 98' through adjustable component 172B' of the forward model 172', while a virtual identity system modeler 100" operates in a manner consistent with the embodiment of FIG. 12 to adjust adjustable component 98" through an adjustable component 98" of the inverse model 198'.

In an exemplary operation, an initial drive 17 is obtained consistent with the methods discussed above (the diagonal values of each of the adjustable components 98', 98" of both inverse models 98 and 198, and the adjustable components 172' and 172" of the forward model all being set equal to one and all of the off-diagonal values being set equal to zero). The initial drive 17 is then applied to the physical system 10 wherein the actual response 21 is measured and recorded. As illustrated, the initial drive 17 is also applied to the forward model 172 to generate the modeled response 176 (an equivalent response to the target response 79 of FIGS. 6 and 8 with switches 177A and 177B in the "G" position).

The virtual identity system modeler 100' compares the actual response 21 to the modeled response 176. In the embodiment illustrated, the virtual identity system modeler 100' comprises the spectrum analyzer 136 and performs spectral analysis between the actual response 21 and the modeled response 176 on a channel-by-channel basis. Consistent with previous embodiments, the deviation of the FRF from identity is then determined by the spectrum analyzer 136 and if one or more of the deviations exceed the corresponding selected threshold, values on the diagonal of the adjustable component 172B' are updated. By simply taking the inverse of the adjustable component 172B', values for the adjustable components 98B' can be easily calculated.

Prior to the next iteration, the virtual identity system modeler 100" is then used to adjust adjustable component 98" based on a comparison of the actual drive 17 and a modeled drive 182 from inverse model 198". In particular, the virtual identity system modeler 100" (including the spectrum analyzer 136) adjusts the inverse model 198" by providing update values (herein relaxed correction values 178) to the adjustable component 98B" thereof. However, in this embodiment, the adjustable component 98B" of the inverse model 98 is also updated in accordance with changes made to the adjustable component 98B" of the inverse model 198", while the forward model 172' is updated by taking the inverse of adjustable component 98" to obtain a corresponding adjustable component 172B" for the forward model 172'. However, it is important to note that the modeled drive 182 is calculated based on use of adjustable component 98B'.

Using the updated inverse model 98 through adjustment of adjustable components 98B' and 98B" as discussed above, a new drive 17 is obtained for the next iteration and, when applied to the physical system 10, a new actual response 21 is then obtained. The process is repeated starting with virtual identity system modeler 100'; however, it should be noted that the modeled response 176 is obtained as a function of the adjustments made in the previous iteration to adjustable component 172B" as well as the adjustments made to adjustable component 172B'.

The virtual identity system modelers 100' and 100" are used for each iteration until the error between the actual response and the desired response is less than a selected threshold. Since the inverse model 98 includes both an adjustable component 98B' (operating on responses) and an adjustable component 98B" (operating on drives), convergence may be more likely because the corrected virtual identity system will be closer to the identity. It should be noted in another mode of operation the virtual identity system modeler 100" can be used first during each iteration followed by use of the virtual identity system modeler 100'.

Figure 14:
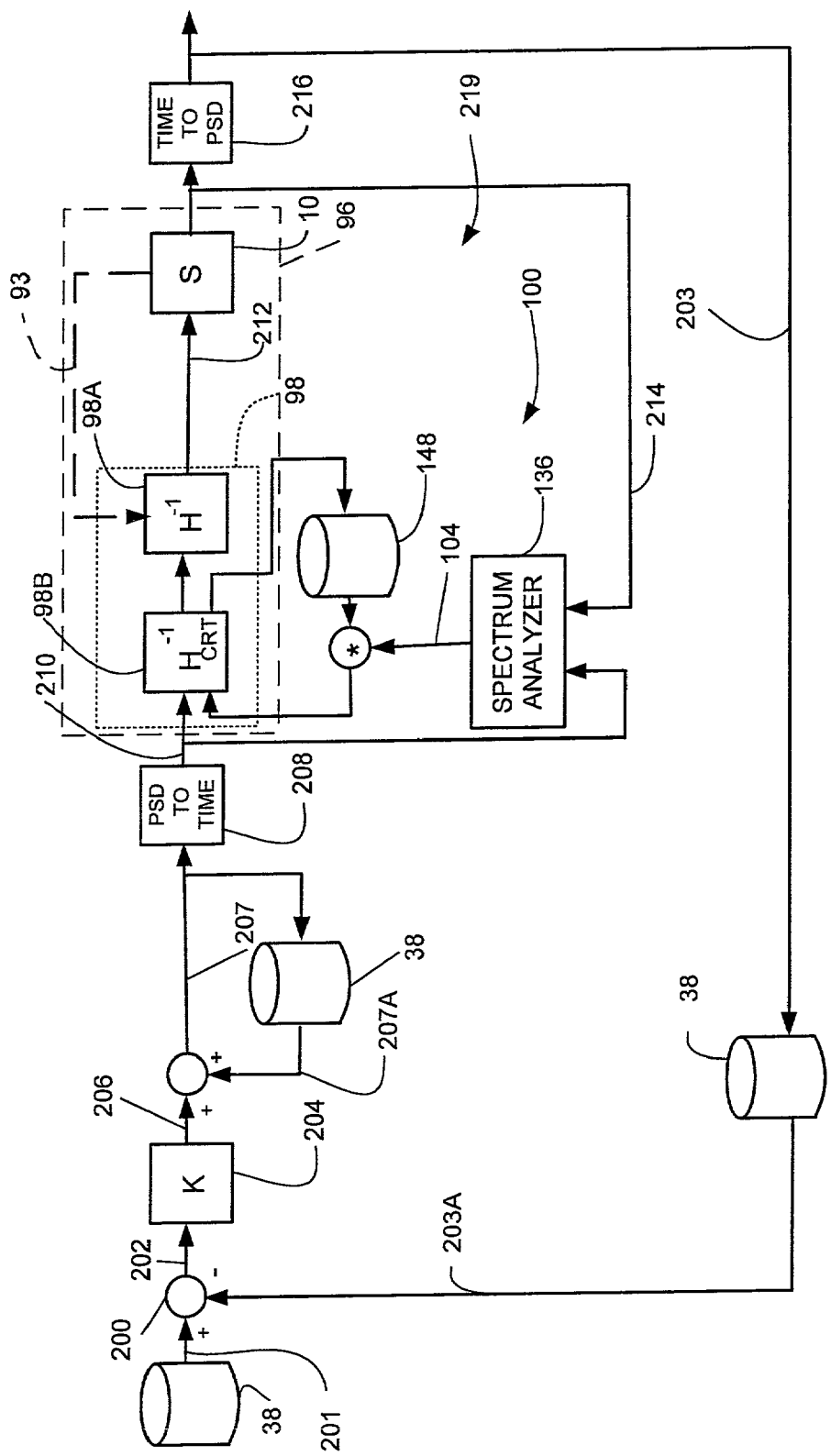
FIG. 14 is a block diagram of a fifth aspect of the present invention.

FIG. 14 illustrates use of the virtual identity system modeler 100 in a Spectral Density Control embodiment. Unlike Time History Control that seeks to reproduce the response of the remote transducers 20 with respect to time, Spectral Density Control seeks to reproduce the signal power in the response (which can include generating the cross-power between channels) as a function of frequency over a selected bandwidth. A power spectral density (PSD) comprises a square matrix with the auto power of each channel on the diagonal and the cross-powers between channels on the respective off-diagonals.

In FIG. 14 the same reference numerals have been used to identify similar components as described with previous embodiments. Generally, a summer 200 calculates a PSD error 202 between a desired PSD response 201 and an actual previous PSD response 203A from the physical system 10. The calculated PSD error 202 is functionally similar to the time history response error 89 calculated in the previous Time History Control embodiments. Commonly, a relaxation gain 204 is applied for substantially the same reasons as the relaxation gain 95 to generate PSD response correction 206. In the embodiment illustrated, the PSD response correction 206 is combined with a previous PSD target response 207A to generate a new PSD target response 207. A PSD-to-time converter 208 converts the PSD target response to the time equivalent target response 210 (similar to target response 79) that is provided to the inverse model 98. The inverse model 98, in turn, is used to generate a drive 212 (similar to drive 17) that is applied to the physical system 10. An actual response 214 (similar to actual response 21) from the physical system 10 is provided to the virtual identity system modeler 100 (herein the spectrum analyzer 136) and to a time-to-PSD converter 216. The virtual identity system modeler 100 checks the quality of identity in a manner similar to the embodiment of FIG. 6 and updates the inverse model 98, and in particular, the adjustable component 98B accordingly. The time-to-PSD converter 216 generates the actual PSD response 203. As appreciated by those skilled in the art, any of the teachings of the previous embodiments of FIGS. 8–12 can be applied by replacing substructure 219 with the corresponding structure of the previous embodiments.

Figure 15:
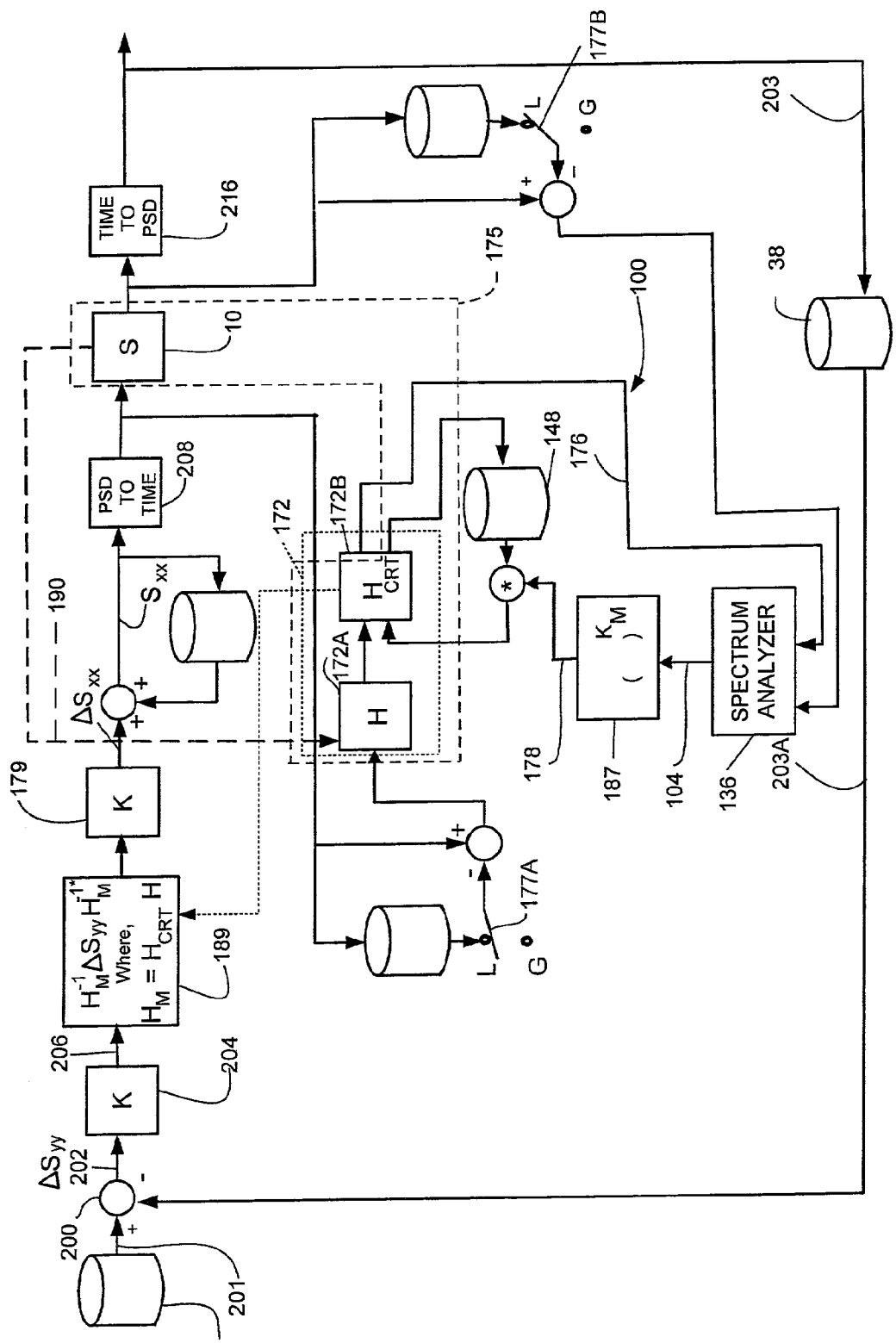
FIG. 15 is a block diagram of a sixth aspect of the present invention.

Another embodiment of Spectral Density Control is illustrated in FIG. 15, wherein the drive spectra are calculated directly from the response spectra in the forward loop as shown in block 189 (as familiar to those skilled in the art)using the inverse system model as obtained from 172. The virtual identity system modeling concepts of FIG. 11 are added to the forward spectral density iteration loop to iteratively adapt the system model 172 for the reasons discussed. As illustrated in FIG. 15, the quality of identity is successively repeated until a desired actual signal power spectral density is obtained after iteration through application of corresponding successive drives, and wherein each the actual signal power spectral density outputs is obtained as a function of a corresponding drive power spectral density. As appreciated by those skilled in the art, the teachings of the embodiments of FIG. 12 or 13A and 13B can be similarly used.

Figure 16:
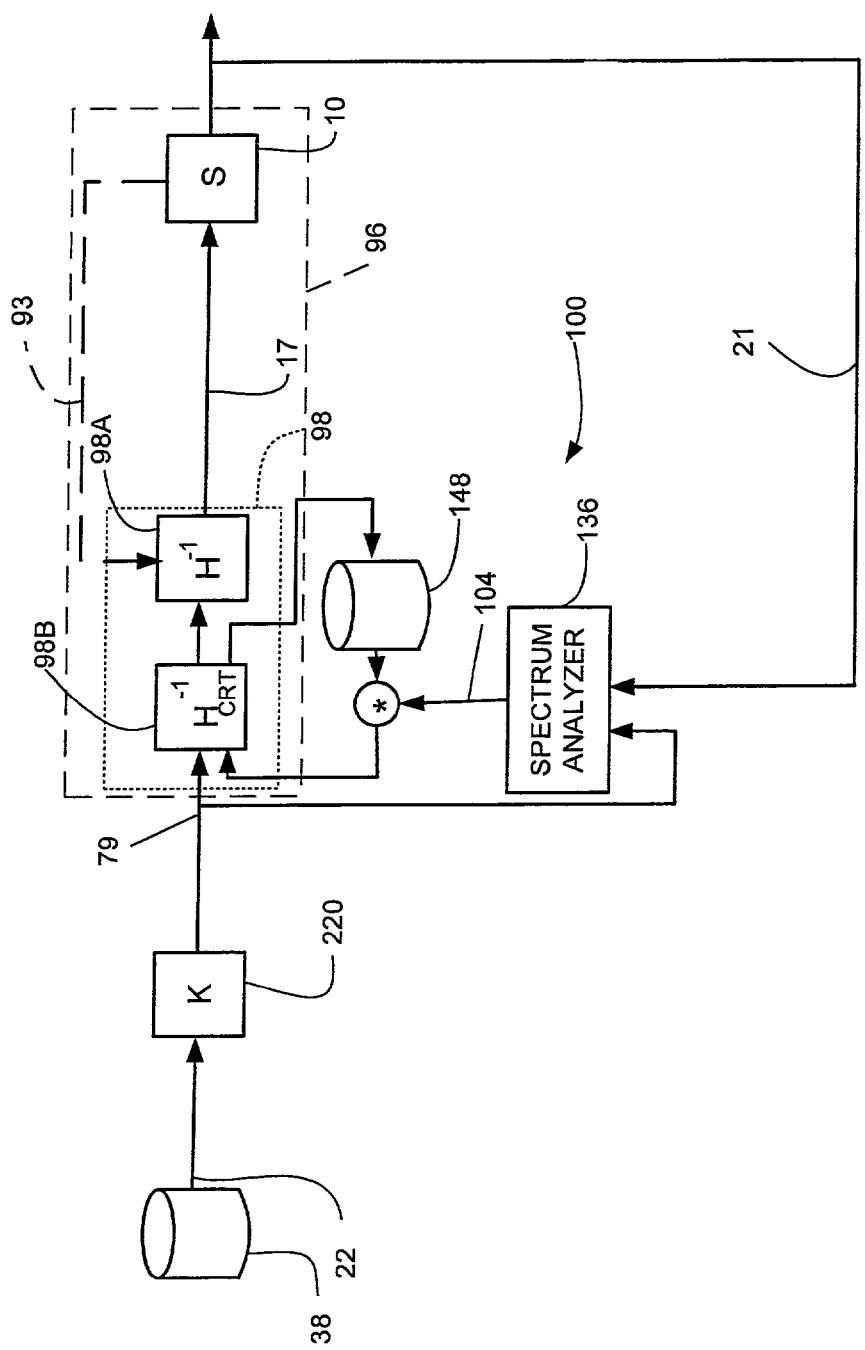
FIG. 16 is a block diagram of a seventh aspect of the present invention.

FIG. 16 illustrates use of a Waveform Control embodiment. Like Time History Control, Waveform Control seeks to reproduce the response of the remote transducers 20 with respect to time. Waveform Control does so however without the feedback of the actual response into a summer to provide the response error 89. Rather, each iteration in Waveform Control uses the desired response 22 directly, applied through an attenuation factor 220 to make the target response 79.

Prior art techniques in Waveform Control recalculated the inverse model each iteration by using drive 17 and actual response 21 for that iteration in an effort to reach convergence. However, in this aspect of the present invention, the virtual identity system 96 includes the inverse model 98 (static component 98A and adjustable component 98B) and physical system 10 as illustrated in FIG. 16. The virtual identity system modeler 100 receives the target response 79 and the actual response 21 to measure the quality of identity. As in the previous embodiments, the adjustable component 98B is updated as a function of the quality of identity. Incorporation of the virtual identity system 96 improves single channel system operation and facilitates extension to multi-channel systems not previously feasible.

Figure 17:
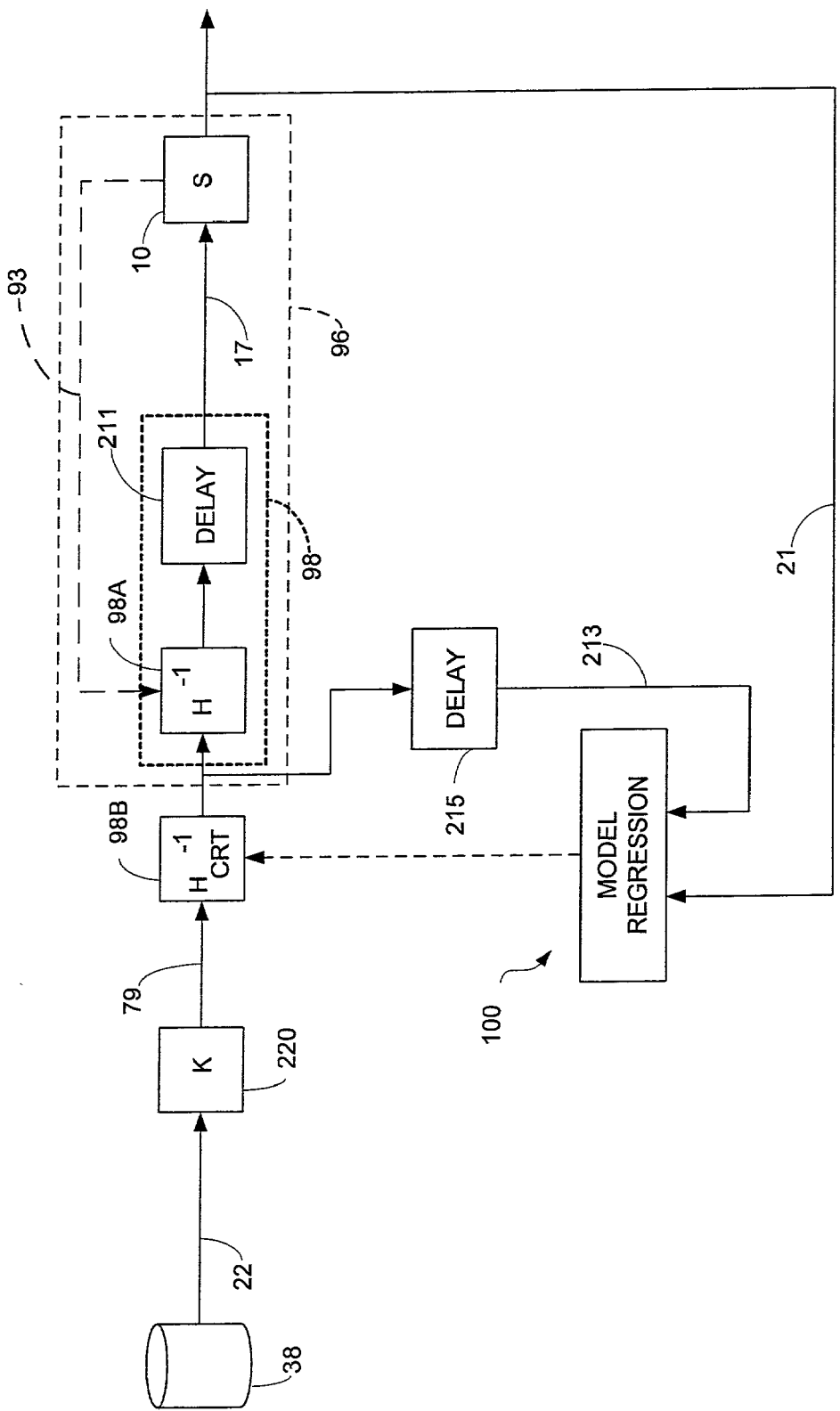
FIG. 17 is a block diagram of an eighth aspect of the present invention.

Time-history control situations that do not lend themselves to iterative corrections, such as very long records that cannot be conveniently repeated, can be handled by the embodiment illustrated in FIG. 17. In such a situation, the correction process must operate continuously over an indeterminately long record. This is commonly referred to as real-time operation.

Real-time operation requires that all operators be physically realizable, that is, not require information (i.e. data) from the future. Note that future values on the time axis are available during iterative corrections. Inverse system models typically do require future information to compensate for any dead-times that might occur in the forward system. Including a time-delay 211 into the static inverse model 98A results in a physically realizable implementation (no future information required). The time-delay 211 should be sufficient to cancel the need for future data.

In this embodiment, the virtual identity system modeler 100 operates on the system response 21 and a delayed version of a virtual identity system input 213 provided by time-delay 215, again expecting to produce a near identity system or near identity inverse-system result. The virtual identity system modeler 100 provides the adjustable component 98B as a function of how the system is behaving over a previous section of the record (i.e. as a function of time). The time-delay 215 should be at least as large as the time-delay 211 in the system inverse implementation to ensure that the correction component 98B is physically realizable. The delays should be as small as possible since their presence impedes the modeling process. Note that the input signal 213 to the virtual identity system modeler 100 is taken after the adjustable correction component 96B in this case to facilitate improved stability of the real-time modeling process.

The models and modeling process can take several forms as discussed previously. A preferred implementation for real-time operation is non-parametric models and modelers based on impulse weights with time-history processing consisting of convolutions. This approach allows the correction component to change from time-point to time-point at the expense of more intense calculations. The real-time modeling process would typically be a least mean square approach to obtaining the impulse weights of the correction component.

Other models and modelers, parametric or non-parametric, can also be used with these concepts. Parametric approaches can facilitate faster model update rates, while requiring prior knowledge of a parametric model that spans model changes with suitable accuracy. The system modeler can also become complex and ill behaved in the parametric case.

For example, in one embodiment, the real-time modeling process can be based on Adaptive Inverse Control methods, although other approaches can be used. Adaptive Inverse Control (AIC) methods are well-known, but are also described in *Adaptive Processing* by B. Widrow and Samuel D. Stearns (1985), which is incorporated herein by reference. However, in a typical AIC control method, the complete inverse model is updated. In contrast, in the embodiment of FIG. 17, the static inverse model 98A is first obtained and used throughout operation. The virtual identity is checked and the adjustable component 98B is adjusted as a function of a virtual identity between the static inverse model 98A and the physical system 10 on a real-time basis.

The virtual identity system modeler normally requires far fewer impulse weights than the number required to represent a complete new inverse model. Thus, convergence can be much more rapid over a smaller amount of data. In addition, the virtual identity system is diagonally dominant and therefore, the multi-channel modeler and correction component process can be simplified to occur on a channel-by-channel basis with good results. This provides a significant advantage in the convergence rate of the modeling process vs. operation over all matrix terms. As in the wave form control process discussed previously, incorporation of the virtual identity system concept into a real-time control implementation improves single-channel system operation and facilitates extension to multi-channel systems not previously feasible.

Although exemplified in FIG. 17 wherein real-time operation is performed on responses, it should be understood that other approaches can be obtained in a manner similar to the various approaches provided above for the iterative situation. The approach of FIG. operates on responses similar to how the approach of FIG. 11 operates on responses. Thus, a real-time system can be obtained for operation on drives similar to the approach of FIG. 12.

Figure 18:
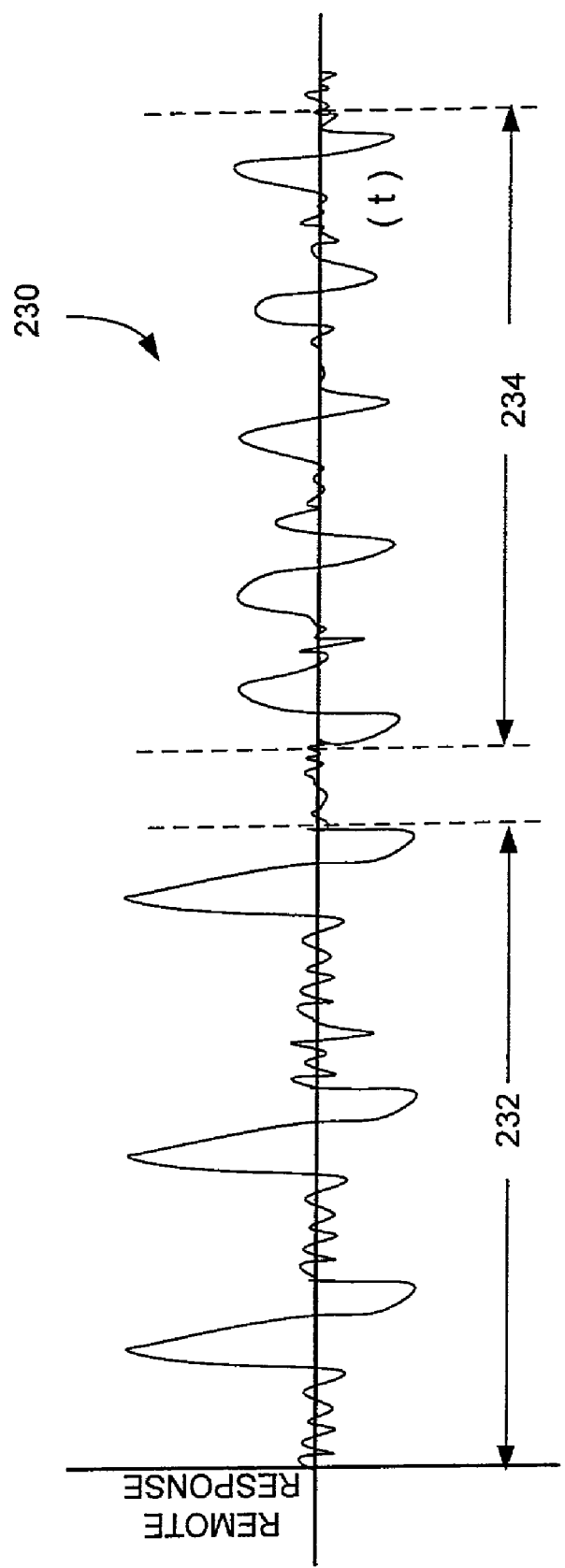
FIG. 18 is a pictorial representation of a ninth aspect of the present invention.

FIG. 18 is a pictorial representation 230 of an example time history record of remote transducer response data from a statistically non-stationary road surface; where a first section 232 is indicative of a sequence of potholes, and where a second section 234 is indicative of cobblestones. Another aspect of the present invention includes constructing a virtual identity system for each section 232 and 234, and obtaining an adjustable component 98B for each of the sections 232 and 234 independently of a common static component 98A. In one embodiment, each adjustable component 98B is applied in combination with the common static component 98A to obtain suitable drives for each of the sections 232 and 234, which are further combined to obtain drive 17 for the entire record 230. As appreciated by those skilled in the art, different static components can be used for each of the sections 232 and 234. Note that virtual identity system modelers are not required to apply to contiguous sections of the record 230.

It should also be noted that the basis of comparison for the virtual identity need not be the same for each region or section throughout the time history. In other words, the basis of comparison can change from section to section. Using FIGS. 13A and 13B for illustrative purposes (but not operated in the manner described above), the drive 17 for section 232 could be obtained by applying the actual response 21 from the physical system 10 and a modeled target response 176 from the forward model 172' to the virtual identity system modeler 100' to adjust the adjustable component 98' in a manner similar to the embodiment of FIG. 11, wherein the virtual identity system modeler 100" and thus the adjustable component 98B" are not used (either removed or wherein each diagonal value is set equal 1 and the off diagonals values set to zero). Likewise, the drive 17 for section 234 could be obtained by ascertaining the quality of the identity using the virtual identity system modeler 100" by comparing drive 17 applied to the physical system 10 with a corresponding modeled drive signal 182 obtained from the inverse model 198 in a manner similar to FIG. 12, wherein the virtual identity system modeler 100' and thus the adjustable component 98B' are not used (either removed or wherein each diagonal value is set equal 1 and the off diagonals values set to zero). Thus, the inverse model 98 can be updated for subregions of a record or in time. However, it should also be noted that the inverse model 98 can be updated for less than all of the channels. Furthermore, the regions based on a comparison of drives can overlap with some or all of the regions based on a comparison on responses using the same or different number of channels. In FIGS. 13A and 13B adjustable components 98B'(1) to 98'(N), 98B"(1) to 98B"(N), 172B'(1) to 172B'(N), and 172B'(1) to 172B"(N) can represent either matrices for different regions or matrices used in the time varying approach. Each correction component 98B'(1) to 98'(N), 98B"(1) to 98B"(N), 172B'(1) to 172B'(N), and 172B"(1) to 172B"(N) contains a description of the subregion (time-history and channels) over which it is applicable. This information is used by the virtual identity system modeler to obtain a particular correction component.

Although not directly pertinent to the present invention, if different models are used for different regions or sections of the record, it may be helpful to taper or otherwise control application of the signals to models of subsequent regions as described in co-pending application entitled "MULTIPLE REGION CONVOLVER WITH TAPERING", filed Sep. 21, 2001 and assigned Ser. No. 09/960,626.

Figure 19:
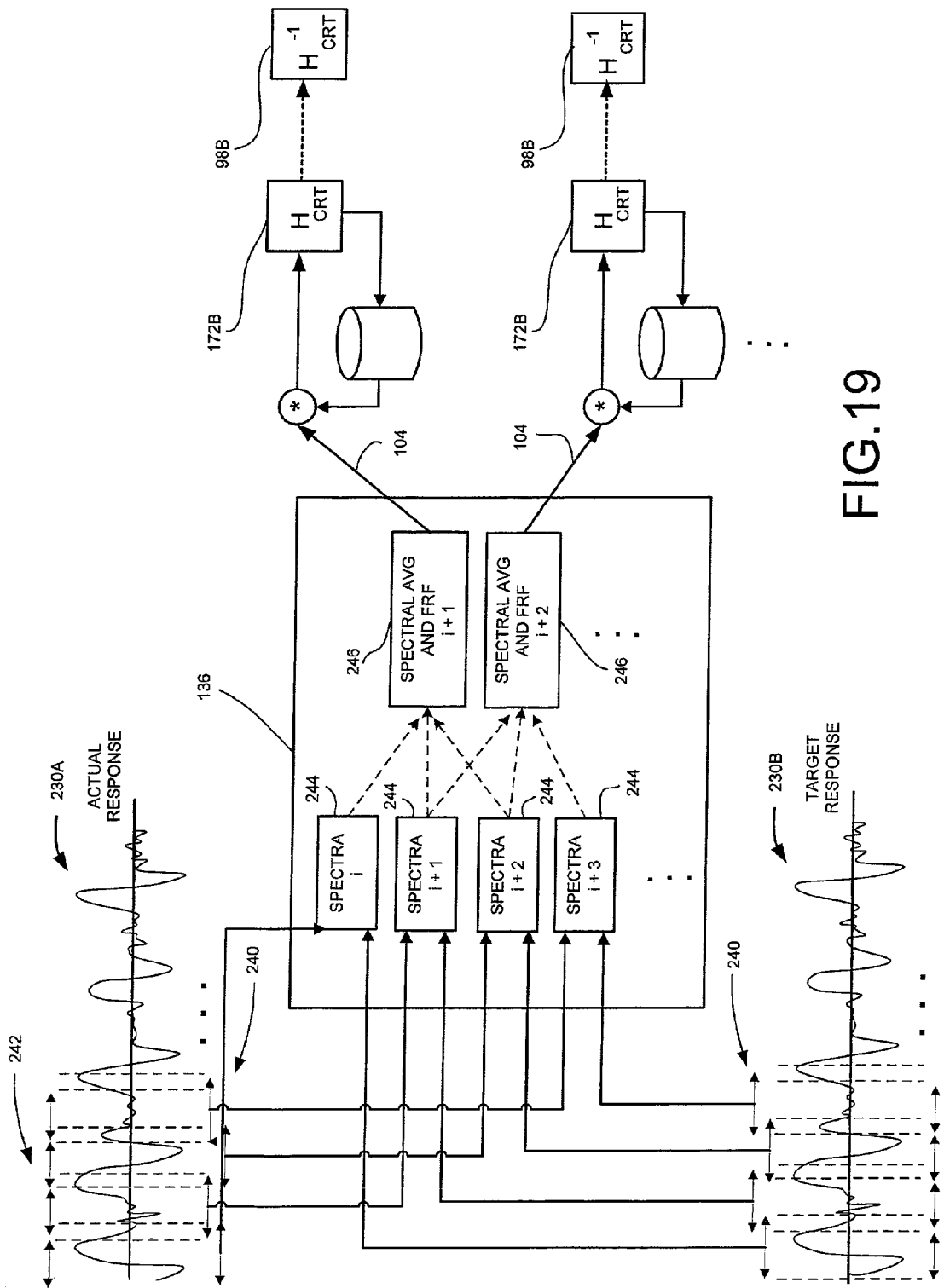
FIG. 19 is a block diagram of a tenth aspect of the present invention.

Referring to FIG. 19, another aspect of the present invention includes allowing the model to vary within a section (e.g. section 234) or over the entire record 230, as illustrated below. Using this "time varying" approach, the spectrum analyzer 136 operates on consecutive and preferably overlapping analysis windows 240 from each of the target and actual responses. Each of the target and actual responses is advanced by a selected time step 242, thereby producing a sequence of spectral values 244 (as opposed to one net spectral average implied in the previous embodiments). In this case, each of the target and actual spectral averages is formed as a two-sided running average of the respective individual spectral values, hence corresponding time varying spectral averages 246 result. The step 242 is typically between 10–90 percent of the analysis window or frame 240. Preferably, the step is 10–50 percent of the analysis window.

The individual elements of the time varying spectral averages 246 are processed to form a time varying model 104(e.g. FRF) and a time varying model correction component similar to 172B per techniques discussed in the previous embodiments. Each correction component member 172B and corresponding inverse correction component member 98B of the sequence of correction components advances in respect to the time history, whereby processing occurs in time steps equal to time step 242. Generating drive 17 involves applying each correction component 172B and corresponding inverse correction component 98B of the sequence of the correction components to the respective time step 242 of the input record of the target response 230B and combining the results thereof to produce a contiguous drive 17.

This time varying approach can be used selectively on different regions of the record. It can also be used over the same portion of the record to which any of the previous approaches were also used, the benefit being that the "time varying" approach further refines the model where the simpler, non-time varying approach sets a new reference for the model before the time-varying approach is applied. Likewise, with reference to FIGS. 13A and 13B, the time varying approach can be used selectively based on a comparison of drives or based on a comparison of responses for each iteration.

Summarizing this embodiment, consecutive and preferably overlapping analysis windows 240 of the record 230 are formed in a stepwise fashion. In the context of the spectral analyzer 136, individual spectral values 244 are obtained for each analysis window 240. Individual spectral values 244 are the combined to form two-sided running spectral averages and corresponding FRFs, which are used in a step-wise manner to generate drive 17 or drive correction 94. Note that other statistical functions can be performed instead of or in addition to averaging.

The spectral running average environment has an inherent stepwise character for processing the model update and applying the model correction. In an alternative embodiment, the correction model can be implemented in parametric form (i.e. not window based) with associated model regression method types such as AIC, ARX, allowing the model to vary from sample point to sample point of the record 230. While the forward static model would be physically realizable, the forward model correction is generally not physically realizable. Furthermore, because the adaptive process is occurring iteratively, at each sample point both past and future data are generally available to optimize the model regression process.

Figure 20:
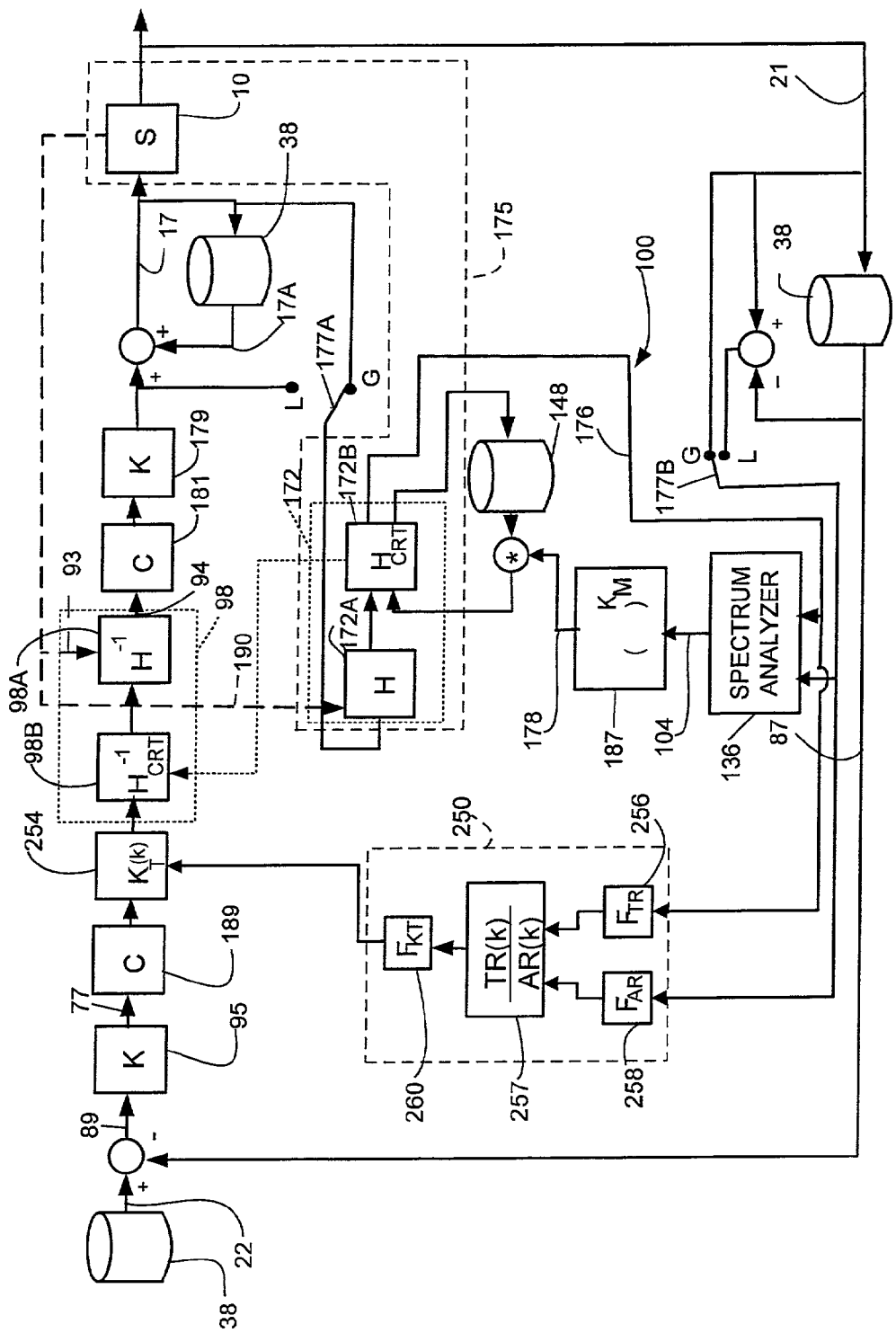
FIG. 20 is a block diagram of eleventh aspect of the present invention.

FIG. 20 is an embodiment of the present invention that facilitates adjusting the gain on the time history input to the inverse model 98 on a sample point by sample point basis. As illustrated, sample point gain adjusting block 250 receives, as input, the target response 176 and the actual response 177B, or the corrections thereof based on the position of switches 177A and 177B. Note these are the same fundamental inputs received by the virtual identity system modeler 100. In other words, this embodiment captures the virtual identity concept for use in a non-linear calculation, in this case an estimate of the gain between the target response and the actual response.

The basic operation of the sample point gain adjusting block 250 is to relate the target response to the actual response (or corrections thereof) at 257 such that a ratio or gain is realized on a sample point by sample point basis, indicated as a (k), thus modeling the correction gain. The output gain per sample point is then applied at 254 to adjust the time history input to the inverse system model 98.

In one embodiment, as indicated in FIG. 20, it may be desirable to apply filtering and threshold operations 256 and 258 to the input signals, which is illustrated as forming part of the sample point gain adjusting block 250. Similarly, it may be desirable to provide a filter 260 to filter the output of the sample point gain adjusting block 250. As appreciated by those skilled in the art, sample point gain adjusting block 250 and block 254 can be incorporated in any of the Time History Control embodiments described above, including changing drives for instance adding another adjustable gain element (similar to gain element 254) after adjustable component 98B in FIG. 12. As appreciated by those skilled in the art, the drive 17 provided to the system 10 is being adjusted for non-linearities as a function of the quality of identity.

Although the present invention has been described with reference to preferred embodiments, workers skilled in the art will recognize that changes may be made in form and detail without departing from the spirit and scope of the invention. For example, in FIG. 11 (similarly in other embodiments), for certain model types it can be advantageous to directly update (i.e. non-iteratively) the inverse model correction 98B. In this scenario, the virtual identity system modeler 100 would receive as an input model response from static component 172A for all iterations. Further, the relaxed correction values 178 from the virtual identity system modeler 100 are directly applied as the inverse model correction 98B.

What is claimed is:

1. A computer implemented method of controlling a physical system having at least one actuator that is operable based on a drive to produce a selected output, the method comprising:
   defining a virtual identity system which includes the physical system and a form of a model of the physical system stored in a computer;
   providing a drive initiated by the computer to operate the at least one actuator;
   receiving an actual output from the physical system indicative of a measured physical parameter;
   checking a quality of identity of the virtual identity system using at least a function of the actual output and the form of the model stored on the computer; and
   controlling the physical system using the computer as a function of checking the quality of identity of the virtual identity system.

2. The computer implemented method of claim 1 wherein the virtual identity system includes at least one of an inverse model of the physical system and a forward model of the physical system and wherein the drive comprises a plurality of drive components and the actual output comprises a plurality of response components.

3. The computer implemented method of claim 2 wherein said at least one of the inverse model of the physical system and the forward model of the physical system includes an adjustable component and a static component.

4. The computer implemented method of claim 3 and further comprising:
   adjusting the adjustable component as a function of the quality of identity.

5. The computer implemented method of claim 4 wherein checking the quality of identity is successively repeated until a desired actual signal is obtained after iteration through application of corresponding successive drives, and wherein each of the actual signal outputs is obtained as a function of corresponding drive.

6. The computer implemented method of claim 2 and further comprising:
adjusting said at least one of the inverse model of the physical system and the forward model of the physical system as a function of the quality of identity.

7. The computer implemented method of claim 6 wherein controlling the physical system includes generating a drive as a function of the inverse model of the physical system.

8. The computer implemented method of claim 7 and further comprising adjusting the drive for non-linearities as a function of the quality of identity.

9. The computer implemented method of claim 6 wherein said at least one of the inverse model of the physical system and the forward model of the physical system includes an adjustable component and a static component.

10. The computer implemented method of claim 9 wherein the drive is obtained as a function of a plurality of adjustable components applied over differing time regions to obtain a desired response.

11. The computer implemented method of claim 10 wherein the same static component is used with each of the plurality of adjustable components.

12. The computer implemented method of claim 9 wherein the drive is obtained as a function of a sequence of overlapping adjustable components applied over sequential, overlapping time regions to obtain a desired response.

13. The computer implemented method of claim 12 wherein the one static component is used to generate the drive.

14. The computer implemented method of claim 9 wherein checking the quality of identity and generating a drive are successively repeated until a desired actual output is obtained, each new drive providing a corresponding actual output that is used in a successive iteration of checking the quality of identity.

15. The computer implemented method of claim 14 wherein the quality of identity is a function of comparing the actual output and a target output.

16. The computer implemented method of claim 14 wherein checking the quality of identity is a function of comparing a difference between successive actual outputs with a difference between successive target outputs.

17. The computer implemented method of claim 14 wherein the virtual identity includes the forward model of the physical system, and wherein checking the quality of identity includes providing the drive to the forward model of the physical system to obtain a modeled output and comparing a first signal being a function of the modeled output with a second signal being a function of the actual output, and wherein the method further comprises adjusting the adjustable component as a function of comparing the first signal and the second signal.

18. The computer implemented method of claim 17 wherein the first signal comprises a difference between successive modeled outputs and the second signal comprises a difference between successive actual outputs.

19. The computer implemented method of claim 14 wherein the virtual identity includes the inverse model of the physical system, and wherein checking the quality of identity includes providing the actual output to the inverse model of the physical system to obtain a modeled drive and comparing a first signal being a function of the modeled drive with a second signal being a function of the drive corresponding to the actual output, and wherein the method further comprises adjusting the adjustable component as a function of comparing the first signal and the second signal.

20. The computer implemented method of claim 19 wherein the first signal comprises a difference between successive modeled drives and the second signal comprises a difference between successive drives of corresponding successive actual outputs.

21. The computer implemented method of claim 2 wherein the virtual identity system comprises a static component of said at least one of an inverse model of the physical system and a forward model of the physical system, and wherein controlling the physical system includes non-iteratively generating a drive as a function of the static component of said at least one of an inverse model of the physical system and a forward model of the physical system, an adjustable component and a desired output, and wherein the method further comprises continuously adjusting the adjustable component as a function of a quality of identity on a real-time basis.

22. The computer implemented method of claim 9 wherein checking the quality of identity and generating a drive are successively repeated until a desired actual signal power spectral density is obtained, and wherein the drive comprises a signal in the time domain.

23. The computer implemented method of claim 1 wherein the virtual identity system includes a forward model comprising a static component being a forward model of the physical system, a first adjustable component and a second adjustable component, and wherein a second virtual identity system comprises an inverse model of the physical system comprising a static component being an inverse model of the physical system, a third adjustable component being an inverse of the first adjustable component, and a fourth adjustable component being an inverse of the second adjustable component, and wherein checking the quality of identity includes: providing the drive to the forward model to obtain a modeled output and comparing a first signal being a function of the modeled output with a second signal being a function of the actual output; and providing the actual output to the inverse model to obtain a modeled drive and comparing a third signal being a function of the modeled drive with a fourth signal being a function of the drive corresponding to the actual output; and wherein the method further comprises adjusting the second adjustable component as a function of comparing the first signal and the second signal and adjusting the third adjustable component as a function of comparing the third signal and the fourth signal, and wherein controlling the physical system comprises controlling the physical system as a function of checking the quality of identity of the first-mentioned virtual identity system and the second virtual identity system.

24. A computer readable medium including instructions readable by a computer, which when implemented, cause the computer to control a physical system having at least one actuator that is operable based on a drive to produce a selected output, the instructions performing steps comprising:
defining a virtual identity system and a form of a model of the physical system;
providing a drive to the servo controller initiated by the computer to operate the at least one actuator;
receiving an actual output from the physical system indicative of a measured physical parameter;
checking a quality of identity of the virtual identity system using at least a function of the actual output and the form of the model; and controlling the physical system using the computer as a function of checking the quality of identity of the virtual identity system.

25. The computer readable medium of claim 24 wherein the virtual identity system includes at least one of an inverse model of the physical system and a forward model of the physical system and wherein the drive comprises a plurality of drive components and the actual output comprises a plurality of response components.

26. The computer readable medium of claim 25 wherein said at least one of the inverse model of the physical system and the forward model of the physical system includes an adjustable component and a static component.

27. The computer readable medium of claim 26 and further instructions for performing a step comprising:
adjusting the adjustable component as a function of the quality of identity.

28. The computer readable medium of claim 27 wherein checking the quality of identity is successively repeated until a desired actual signal is obtained after iteration through application of corresponding successive drives, and wherein each of the actual signal outputs is obtained as a function of corresponding drive.

29. The computer readable medium of claim 25 and further comprising instructions for performing a step comprising:
adjusting said at least one of the inverse model of the physical system and the forward model of the physical system as a function of the quality of identity.

30. The computer readable medium of claim 29 wherein controlling the physical system includes generating a drive as a function of the inverse model of the physical system.

31. The computer readable medium of claim 30 and further comprising adjusting the drive for non-linearities as a function of the quality of identity.

32. The computer readable medium of claim 29 wherein said at least one of the inverse model of the physical system and the forward model of the physical system includes an adjustable component and a static component.

33. The computer readable medium of claim 32 wherein the drive is obtained as a function of a plurality of adjustable components applied over differing time regions to obtain a desired response.

34. The computer readable medium of claim 33 wherein the same static component is used with each of the plurality of adjustable components.

35. The computer readable medium of claim 32 wherein the drive is obtained as a function of a sequence of overlapping adjustable components applied over sequential, overlapping time regions to obtain a desired response.

36. The computer readable medium of claim 35 wherein the one static component is used to generate the drive.

37. The computer readable medium of claim 32 wherein checking the quality of identity and generating a drive are successively repeated until a desired actual output is obtained, each new drive providing a corresponding actual output that is used in a successive iteration of checking the quality of identity.

38. The computer readable medium of claim 37 wherein the quality of identity is a function of comparing the actual output and a target output.

39. The computer readable medium of claim 37 wherein checking the quality of identity is a function of comparing a difference between successive actual outputs with a difference between successive target outputs.

40. The computer readable medium of claim 37 wherein the virtual identity includes the forward model of the physical system, and wherein checking the quality of identity includes providing the drive to the forward model of the physical system to obtain a modeled output and comparing a first signal being a function of the modeled output with a second signal being a function of the actual output, and wherein the instructions further comprise adjusting the adjustable component as a function of comparing the first signal and the second signal.

41. The computer readable medium of claim 40 wherein the first signal comprises a difference between successive modeled outputs and the second signal comprises a difference between successive actual outputs.

42. The computer readable medium of claim 37 wherein the virtual identity includes the inverse model of the physical system, and wherein checking the quality of identity includes providing the actual output to the inverse model of the physical system to obtain a modeled drive and comparing a first signal being a function of the modeled drive with a second signal being a function of the drive corresponding to the actual output, and wherein the instructions further comprise adjusting the adjustable component as a function of comparing the first signal and the second signal.

43. The computer readable medium of claim 42 wherein the first signal comprises a difference between successive modeled drives and the second signal comprises a difference between successive drives of corresponding successive actual outputs.

44. The computer readable medium of claim 32 wherein checking the quality of identity and generating a drive are successively repeated until a desired actual signal power spectral density is obtained, and wherein the drive comprises a signal in the time domain.

45. The computer readable medium of claim 25 wherein the virtual identity system comprises a static component of said at least one of an inverse model of the physical system and a forward model of the physical system, and wherein controlling the physical system includes non-iteratively generating a drive as a function of the static component of said at least one of an inverse model of the physical system and a forward model of the physical system, an adjustable component and a desired output, and wherein the instructions further comprise continuously adjusting the adjustable component as a function of a quality of identity on a real-time basis.

46. The computer readable medium of claim 24 wherein the virtual identity system includes a forward model comprising a static component being a forward model of the physical system, a first adjustable component and a second adjustable component, and wherein a second virtual identity system comprises an inverse model of the physical system comprising a static component being an inverse model of the physical system, a third adjustable component being an inverse of the first adjustable component, and a fourth adjustable component being an inverse of the second adjustable component, and wherein checking the quality of identity includes: providing the drive to the forward model to obtain a modeled output and comparing a first signal being a function of the modeled output with a second signal being a function of the actual output; and providing the actual output to the inverse model to obtain a modeled drive and comparing a third signal being a function of the modeled drive with a fourth signal being a function of the drive corresponding to the actual output; and wherein the instructions further comprise adjusting the second adjustable component as a function of comparing the first signal and the second signal and adjusting the third adjustable component as a function of comparing the third signal and the fourth signal, and wherein controlling the physical system comprises controlling the physical system as a function of checking the quality of identity of the first-mentioned virtual identity system and the second virtual identity system.

47. A system controller for controlling a physical system having at least one actuator that is operable based on a drive to produce a selected output, the system controller comprising:

means for defining a virtual identity system which includes the physical system;

means for defining a form of a model stored on a computer;

means for providing a drive to operate the at least one actuator;

means for receiving an actual output indicative of a measured physical parameter; and means for checking a quality of identity of the virtual identity system using at least a function of the actual output and the form of the model stored on the computer.

48. The system controller of claim 47 wherein the virtual identity system includes at least one of an inverse model of the physical system and a forward model of the physical system and wherein the drive comprises a plurality of drive components and the actual output comprised a plurality of response components.

49. The system controller of claim 48 wherein said at least one of the inverse model of the physical system and the forward model of the physical system includes an adjustable component and a static component.

50. The system controller of claim 49 and further comprising:

means for adjusting the adjustable component as a function of the quality of identity.

51. The system controller of claim 48 and further comprising:

means for adjusting said at least one of the inverse model of the physical system and the forward model of the physical system as a function of the quality of identity.

\* \* \* \* \*